United States Patent
Hayashibe et al.

(10) Patent No.: US 9,588,259 B2
(45) Date of Patent: Mar. 7, 2017

(54) OPTICAL ELEMENT INCLUDING PRIMARY AND SECONDARY STRUCTURES ARRANGED IN A PLURALITY OF TRACKS

(75) Inventors: Kazuya Hayashibe, Saitama (JP); Sohmei Endoh, Miyagi (JP)

(73) Assignee: Sony Corporation, Tokyo (JP)

( * ) Notice: Subject to any disclaimer, the term of this patent is extended or adjusted under 35 U.S.C. 154(b) by 588 days.

(21) Appl. No.: 12/677,587

(22) PCT Filed: Jul. 15, 2009

(86) PCT No.: PCT/JP2009/063143
§ 371 (c)(1),
(2), (4) Date: Jun. 18, 2010

(87) PCT Pub. No.: WO2010/008091
PCT Pub. Date: Jan. 21, 2010

(65) Prior Publication Data
US 2011/0102900 A1 May 5, 2011

(30) Foreign Application Priority Data

Jul. 16, 2008 (JP) ................ P2008-185264

(51) Int. Cl.
G02B 27/00 (2006.01)
G02B 1/118 (2015.01)
(Continued)

(52) U.S. Cl.
CPC .............. G02B 1/118 (2013.01); G02B 5/045 (2013.01); G02B 1/11 (2013.01); G02B 1/115 (2013.01)

(58) Field of Classification Search
CPC .... G02B 5/208; G02B 5/1866; G02B 5/1871; G02B 5/1814; G02B 5/285; G02B 5/0278;
(Continued)

(56) References Cited

U.S. PATENT DOCUMENTS 5,771,328 A * 6/1998 Wortman et al. ............. 385/146
6,798,574 B2 * 9/2004 Kim ..................... G02B 5/0231
359/566

(Continued)

FOREIGN PATENT DOCUMENTS

| JP | 2005-266252 | 9/2005 | |
| JP | 2007-264594 | 10/2007 | |
| JP | 2008-090212 | 4/2008 | |
| JP | 2008090212 A * | 4/2008 | ........... G02B 5/0278 |
| JP | 2008-158013 | 7/2008 | |
| WO | 2007-034715 | 3/2007 | |

OTHER PUBLICATIONS

International Search Report for corresponding PCT/JP2009/063143 dated Sep. 1, 2009.

(Continued)

*Primary Examiner* — Stephone B Allen
*Assistant Examiner* — Jyotsna Dabbi
(74) *Attorney, Agent, or Firm* — K&L Gates LLP

(57) ABSTRACT

An optical element includes a base, and primary structures and secondary structures disposed on a surface of the base, each of the primary structures and secondary structures being a projection or a depression. The primary structures constitute a plurality of rows of tracks on the surface of the base and are periodically repeatedly arranged at a fine pitch equal to or smaller than a wavelength of visible light. The secondary structures are smaller in size than the primary structures, and are provided between the primary structures, in the gaps in the arrangement of the primary structures, or on the surfaces of the primary structures.

10 Claims, 31 Drawing Sheets

(51) Int. Cl.
*G02B 5/04* (2006.01)
*G02B 1/115* (2015.01)
*G02B 1/11* (2015.01)

(58) Field of Classification Search
CPC .... G02B 5/045; G02B 27/46; G02B 27/1814; G02B 27/0018; G02B 6/02152; G02B 1/115; G02B 6/0038; G02B 6/0053; G02B 6/0031; F21V 17/00; F21V 5/00; F21V 5/04; F21V 7/0091; F21Y 2103/00; F21Y 2101/02; H01J 29/896; H01J 29/89; G02F 1/13452; G02F 1/133526; G02F 1/133615; G02F 1/133606; G02F 1/133524; G03B 33/00; G03B 15/08; H04N 9/3197; H04N 5/64; H04N 5/72
See application file for complete search history.

(56) References Cited

U.S. PATENT DOCUMENTS

| | | | |
|---|---|---|---|
| 2006/0146571 A1* | 7/2006 | Whitney | 362/615 |
| 2007/0159698 A1* | 7/2007 | Taguchi et al. | 359/586 |
| 2007/0211346 A1 | 9/2007 | Noguchi et al. | |
| 2008/0265149 A1 | 10/2008 | Endoh et al. | |

OTHER PUBLICATIONS

Japanese Office Action issued Apr. 30, 2013 in corresponding Japanese Patent Application No. 2010-520916.

\* cited by examiner

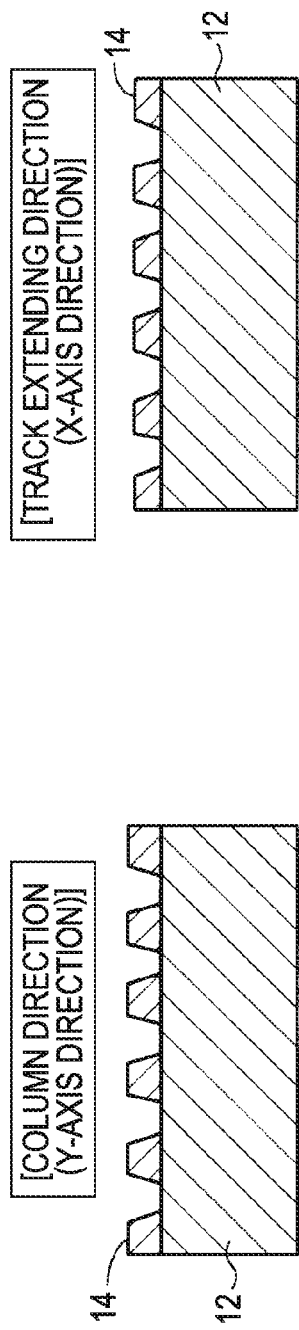
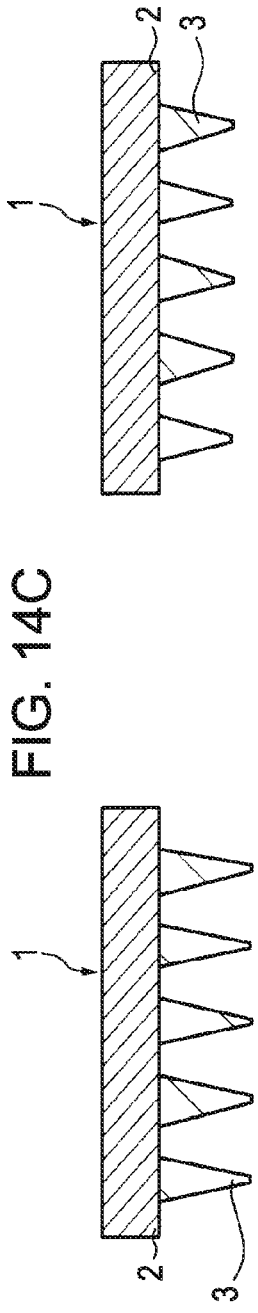
FIG. 14A
FIG. 14B
FIG. 14C

OPTICAL ELEMENT INCLUDING PRIMARY AND SECONDARY STRUCTURES ARRANGED IN A PLURALITY OF TRACKS

CROSS REFERENCE TO RELATED APPLICATIONS

The present application is a national stage of International Application No. PCT/JP2009/063143 filed on Jul. 15, 2009 and claims priority to Japanese Patent Application No. 2008-185264 filed on Jul. 16, 2008, the disclosures of which are incorporated herein by reference.

BACKGROUND

The present invention relates to an optical element. More particularly, the invention relates to an optical element in which many structures formed of projections or depressions are arranged on the surface thereof at a fine pitch equal to or smaller than a wavelength of visible light.

Conventionally, there have been known optical elements including light-transmissive substrates composed of glass, plastic, or the like, which are subjected to surface treatment in order to suppress surface reflection of light. As such surface treatment, a method is known in which fine and dense projections and depressions (moth eyes) are formed on the surface of an optical element (for example, refer to "OPTICAL AND ELECTRO-OPTICAL ENGINEERING CONTACT", Vol. 43, No. 11 (2005), 630-637).

In general, in the case where a periodic projection-depression shape is provided on a surface of an optical element, when light passes through the surface, diffraction occurs, and thereby the amount of the light component that goes straight, of transmitted light, is significantly reduced. However, in the case where the pitch of the projection-depression shape is shorter than the wavelength of light transmitted, diffraction does not occur, and it is possible to obtain an effective anti-reflection effect for single-wavelength light corresponding to the pitch, depth, or the like of the projection-depression shape.

As the moth-eye structure fabricated using electron beam exposure, a moth-eye structure in the shape of fine tents (pitch: about 300 nm, depth: about 400 nm) is disclosed (for example, refer to NTT Advanced Technology Corporation, "Master mold for forming anti-reflective (moth-eye) structure having no wavelength dependency", [online], [searched on Feb. 27, 2008], Internet <http://keytech.ntt-at.co.jp/nano/prd_0033.html>). The moth-eye structure is, for example, believed to be fabricated as follows.

First, a projection/depression pattern is formed by electron beam recording on a photoresist on a Si substrate, and the Si substrate is etched using the projection/depression photoresist pattern as a mask. Thereby, tent-shaped, fine sub-wavelength structures (pitch: about 300 nm, depth: about 400 nm) are formed on the surface of the substrate. A Si master mold is thus fabricated (refer to FIG. 1A). The fine structures are arranged in a tetragonal lattice pattern or in a hexagonal lattice pattern.

The Si master mold thus fabricated can have an anti-reflection effect for light having a wide wavelength range. In particular, as shown in FIG. 1B, when tent-shaped, fine sub-wavelength structures are provided in a hexagonal lattice pattern, a high anti-reflection effect (reflectivity: 1% or less) can be obtained in the visible region (refer to FIG. 2). In FIG. 2, symbols $l_1$ and $l_2$ respectively indicate the reflectivity of the flat portion and the reflectivity of the patterned portion of the Si master mold.

Next, a Ni-plated stamper of the resulting Si master mold R1 is produced (refer to FIG. 3). As shown in FIG. 4, a projection/depression pattern reversed from the projection/depression pattern of the Si master mold is formed on the surface of the stamper. Next, using the stamper, the projection/depression pattern is transferred to a transparent polycarbonate resin. Thereby, an intended optical element (replica substrate) is obtained. The optical element can also have a high anti-reflection effect (reflectivity: 1% or less) (refer to FIG. 5). In FIG. 5, symbols $l_3$ and $l_4$ respectively indicate the reflectivity in the absence of the pattern and the reflectivity in the presence of the pattern.

However, electron beam exposure is disadvantageous in that it requires a long operation time, and is unsuitable for industrial production. Formation of the projection/depression pattern by the electron beam recording and the area that can be exposed depend on the amount of current of electron beam and the dose amount necessary for the resist. For example, in the case where drawing is performed, using a beam of 100 pA, which is used in drawing the finest pattern, on a resist requiring a dose amount of several tens of microcoulombs per square centimeter, such as a calixarene, even if exposure is performed for 24 hours, a square with a side of 200 μm cannot be filled. Furthermore, it takes 25 days or more to expose a square of 1 mm×1 mm, and exposure is believed to be limited to a microdevice with a size of several hundred micrometers or less.

Meanwhile, in the case where drawing is performed, using a beam of 2 nA, which is not substantially increased, on a chemically-amplified resist that can be exposed at about 100 μC/cm$^2$ or less, such as SAL601 or NEB-22, a square of 2 mm×2 mm can be drawn in one hour or less. Note that the required dose amount varies depending on the substrate/development conditions, etc. In general, a high dose amount is suitable for high resolution.

However, even in this production method, it requires a considerably large number of days to expose a small display size, thus being inefficient, which is disadvantageous. For example, it takes 50.8×38.1/(2×2)=483.9 hours (about 20 days) to expose an area of a mobile phone with a small display (2.5 inch; 50.8 mm×38.1 mm), which is currently commonly used.

The Super-RENS Technology Team, the Center for Applied Near-Field Optics Research of the National Institute of Advanced Industrial Science and Technology (hereinafter referred to as "AIST"), has succeeded in the development of a nano-fabrication apparatus on the basis of a thermal lithography technique in which a visible-light laser lithography method using a semiconductor laser (wavelength: 406 nm) and a thermally nonlinear material are combined (for example, refer to the National Institute of Advanced Industrial Science and Technology, "Development of a Desktop Apparatus Enabling Nanometer-scale Microfabrication", [online], [searched on Feb. 27, 2008], Internet <http://aist.go.jp/aist_i/press_release/pr2006/pr20060306/pr20060306.html>).

A technique of high-speed recording on a disc substrate with a diameter of 12 cm has been being developed. Utilizing characteristics of the high-speed/low-cost/large-area fabrication technique of optical discs, AIST and Pulstec Industrial Co., Ltd. have been jointly working on development of optical elements having a nanometer-scale fine structure (moth-eye low-reflection structure) which can be fabricated at high speed with a large area and in which the cost can be reduced, and development of apparatuses.

The thermal lithography technique in which a visible-light laser lithography method and a thermally nonlinear material are combined is a method which utilizes a temperature distribution occurring in a light spot. When a substance is irradiated with light, if the substance has a light-absorbing property, light energy is converted to heat. Light focused by a lens on a substrate has a Gaussian light intensity distribution, and distribution of heat generated owing to absorption of light by the substance has a similar temperature distribution profile.

Consequently, by using, as a light-absorbing material, a material that rapidly changes owing to heat generated by absorption of light, it is possible to realize fine lithography in a size equal to or smaller than the diameter of the light spot. In this method, when a change in volume of a substance is caused in a minute region of a photoresist by thermochemical reaction or thermal diffusion of the substance to perform lithography, it is difficult to fabricate structures with a resolution of 100 nm or less and a high aspect ratio, and reproducibility is also difficult to achieve. Under these circumstances, a new material and process technology have been reexamined, and a thermal lithography technique which can reliably reproduce structures of 100 nm or less with high aspect ratios has been developed. Thereby, a desktop nanometer-scale microfabrication apparatus has been completed.

The nanometer-scale microfabrication apparatus includes a rotational stage, a uniaxial stage, and an auto-focus unit, which enables nanometer-scale, high-speed lithography. Furthermore, a semiconductor laser with a wavelength of 405 nm is used for laser beams for drawing, and an objective lens with a numerical aperture (NA) of 0.85 is used in an optical system for focusing light, thereby realizing a very compact apparatus.

FIG. 6 shows a nano-dot pattern formed by the apparatus having the configuration described above. The result shown in FIG. 6 is obtained by irradiation of blue pulsed laser light while rotating at a rate of 6 m/s (2,600 to 3,600 rpm) to perform drawing. By driving a laser beam at a pulse frequency of 60 MHz, the apparatus can form a dot pattern of 50 nm, which is equal to or less than one-sixth of the light beam spot size, at a rate of 6 million dots/s. The drawing rate of the ordinary electron beam lithography apparatus or the like is about 0.2 m/s, and therefore, the apparatus described above can form nanometer-scale fine structures at a speed 30 times higher than the ordinary apparatus. Furthermore, by combining this technique with a dry etching method used in the semiconductor process, it is possible to form a nano-hole structure with a diameter of 100 nm and a depth of 500 nm or more over the entire surface of a substrate with an optical disc size (diameter: 12 cm). In such a manner, using the apparatus described above, it is possible to fabricate a mold for nano-imprinting having a nanometer-scale fine pattern over a large area at high speed and low cost.

Furthermore, FIG. 7 shows an example in which a fine structure including a $SiO_2$ disc substrate with a diameter of 12 cm having an anti-reflection function is fabricated to reduce light reflectivity. Although it is possible to fabricate the anti-reflective nano-structure at high speed/large area/low cost, the reflectivity is close to 2%, and thus, this structure is not a non-reflection structure, but is a low-reflection structure.

The reason for the fact that a low-reflection structure is produced is believed to be that the density (aperture ratio) the nano-holes is low (50% or less) and the Fresnel reflection at the plane other than the nano-holes is high. In contrast, as shown in FIGS. 1A and 1B, when tent-shaped nano-structures are formed in a closest packing, hexagonal lattice pattern, a non-reflective effect can be realized.

SUMMARY

Technical Problem

As described above, formation of the projection/depression pattern by electron beam recording and the exposure area depend on the amount of current of electron beam and the dose amount necessary for the resist. However, even when exposure is performed on a chemically amplified resist, which can be exposed by a beam of 2 nA at about 100 $\mu C/cm^2$ or less, it takes a long time of about 20 days to expose an area of 2.5 inch. That is, in electron beam exposure, it requires a considerably large number of days to expose even a small display size, thus being inefficient, which is disadvantageous. Moreover, even in an anti-reflective device fabricated over a long period of time, if the device has the conventionally shaped structures, there is limitation in anti-reflection capability.

Furthermore, with respect to the development of a nanometer-scale, fine-structure optical element (moth-eye low-reflection structure) on the basis of a thermal lithography technique in which a visible-light laser lithography method using a semiconductor laser (wavelength: 406 nm) and a thermally nonlinear material are combined, in which, utilizing characteristics of the high-speed/low-cost/large-area fabrication technique of optical discs, it is possible to fabricate the optical element at high speed with a large area and in which the cost can be reduced, the reflectivity is close to 2%, and thus this structure is not a non-reflection structure, but is a low-reflection structure, which is disadvantageous.

Furthermore, by synchronizing a Format Generator to a Rotation & Translation Controller to generate a signal and performing patterning at CAV and at an appropriate feed pitch so that two-dimensional patterns are spatially linked to one another, it is possible to form a complete hexagonal lattice. However, the lattice constant varies as follows: 340 nm at the inner circumference, 400 nm at the middle circumference, and 460 nm at the outer circumference. Therefore, at the middle circumference and the outer circumference, because of large lattice constant (lattice pitch), visible light is diffracted, and the moth-eye anti-reflection effect cannot be obtained, which is disadvantageous.

Accordingly, it is an object of the present invention to provide an optical element having high productivity and excellent anti-reflection characteristics.

Technical Solution

In order to overcome the problems described above, the present invention provides an optical element including a base, and primary structures and secondary structures disposed on a surface of the base, each of the primary structures and secondary structures being a projection or a depression, wherein the primary structures constitute a plurality of rows of tracks on the surface of the base and are periodically repeatedly arranged at a fine pitch equal to or smaller than a wavelength of visible light; and the secondary structures are smaller in size than the primary structures.

In such a case, preferably, the primary structures are connected to one another by the secondary structures of a fine, protruding shape. Here, preferably, the primary structures are arranged in a hexagonal lattice pattern or in a quasi-hexagonal lattice pattern, or in a tetragonal lattice pattern or in a quasi-tetragonal lattice pattern, and in the lattice arrangement, adjacent portions of the primary structures are connected to one another by the secondary structures.

Furthermore, preferably, the secondary structures have a spatial frequency component higher than the arrangement period of the primary structures. In this case, the frequency component of the secondary structures is preferably two times or more, and more preferably four times or more the frequency component of the primary structures. Furthermore, in such a case, preferably, the frequency component of the secondary structures is selected so as not to be an integral multiple of the frequency of the primary structures. In arranging the secondary structures, when gaps are created between the primary structures, the secondary structures are preferably formed so as to fill the gaps. Furthermore, the secondary structures may be provided on the surfaces of the primary structures. In such a case, preferably, the secondary structures have a depth of about 10 to 150 nm.

Furthermore, preferably, the secondary structures are formed using a material having a lower refractive index than the base and the primary structures. In this case, preferably, the secondary structures are formed in the gaps between the primary structures or on the surfaces of the primary structures.

In the present invention, preferably, the primary structures are periodically arranged in a tetragonal lattice pattern or in a quasi-tetragonal lattice pattern. Here, the term "tetragonal lattice" refers to a regular tetragonal lattice. The term "quasi-tetragonal lattice" refers to a regular tetragonal lattice which is distorted, unlike a regular tetragonal lattice.

For example, in the case where primary structures are arranged linearly, the term "quasi-tetragonal lattice" refers to a tetragonal lattice obtained by stretching and distorting a regular tetragonal lattice in the linear arrangement direction (track direction). In the case where the primary structures are arranged in an arc shape, the term "quasi-tetragonal lattice" refers to a tetragonal lattice obtained by distorting a regular tetragonal lattice in an arc shape, or refers to a tetragonal lattice obtained by stretching and distorting a regular tetragonal lattice in the linear arrangement direction (track direction) and distorting it in an arc shape.

In the present invention, preferably, the primary structures are periodically arranged in a hexagonal lattice pattern or in a quasi-hexagonal lattice pattern. Here, the term "hexagonal lattice" refers to a regular hexagonal lattice. The term "quasi-hexagonal lattice" refers to a regular hexagonal lattice which is distorted, unlike a regular hexagonal lattice.

For example, in the case where primary structures are arranged linearly, the term "quasi-hexagonal lattice" refers to a hexagonal lattice obtained by stretching and distorting a regular hexagonal lattice in the linear arrangement direction (track direction). In the case where the primary structures are arranged in an arc shape, the term "quasi-hexagonal lattice" refers to a hexagonal lattice obtained by distorting a regular hexagonal lattice in an arc shape, or refers to a hexagonal lattice obtained by stretching and distorting a regular hexagonal lattice in the linear arrangement direction (track direction) and distorting it in an arc shape.

In the present invention, the bottom face of each primary structure is preferably in the shape of an ellipse or a circle. Here, the term "ellipse" includes not only mathematically defined perfect ellipses, but also slightly distorted ellipses (such as oblongs and ovals). The term "circle" includes not only mathematically defined perfect circles (true circles), but also slightly distorted circles.

In the present invention, the term "orientations of 6-fold symmetry" means orientations of 60°×n (where n is an integer of 1 to 6). Furthermore, the term "orientations of substantial 6-fold symmetry" means orientations of (60°× n)±δ (where n is an integer of 1 to 6; and 0°<δ≤11°, preferably 3°≤δ≤6°.

In the present invention, the term "orientations of 4-fold symmetry" means orientations of 90°×n (where n is an integer of 1 to 4). Furthermore, the term "orientations of substantial 4-fold symmetry" means orientations of (90°× n)°±δ (where n is an integer of 1 to 4; and 0°<δ≤11°).

In the present invention, primary structures are arranged on a surface of a base such that the primary structures constitute a plurality of rows of tracks and are periodically repeated at a fine pitch equal to or smaller than a wavelength of visible light, and secondary structures smaller in size than the primary structures are disposed on the surface of the base. Therefore, it is possible to obtain an optical element having high anti-reflection characteristics compared with conventional optical elements.

Advantageous Effects

As described above, according to the present invention, it is possible to realize an optical element having high productivity and excellent anti-reflection characteristics.

Additional features and advantages of the present invention are described in, and will be apparent from, the following Detailed Description and the Figures.

BRIEF DESCRIPTION OF THE FIGURES

FIGS. 14A to 14C are views illustrating processes of an example of a method for fabricating an optical element according to the first embodiment of the present invention.

DETAILED DESCRIPTION

Figure 1B:
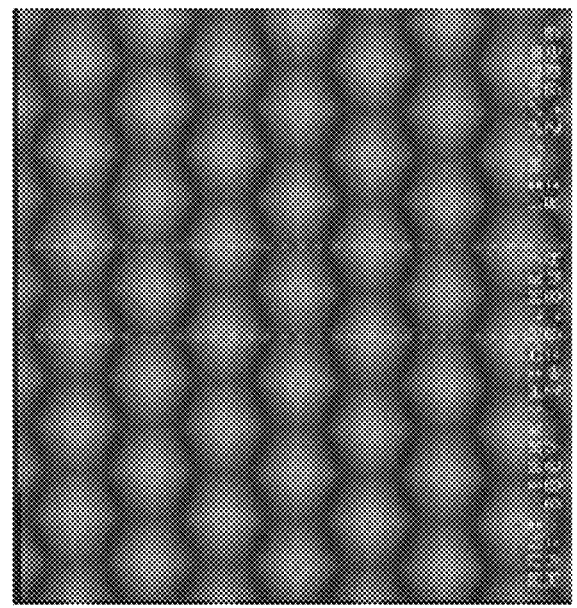
FIGS. 1A and 1B are photographs each showing a structure of a conventional Si master mold.
Figure 1A:
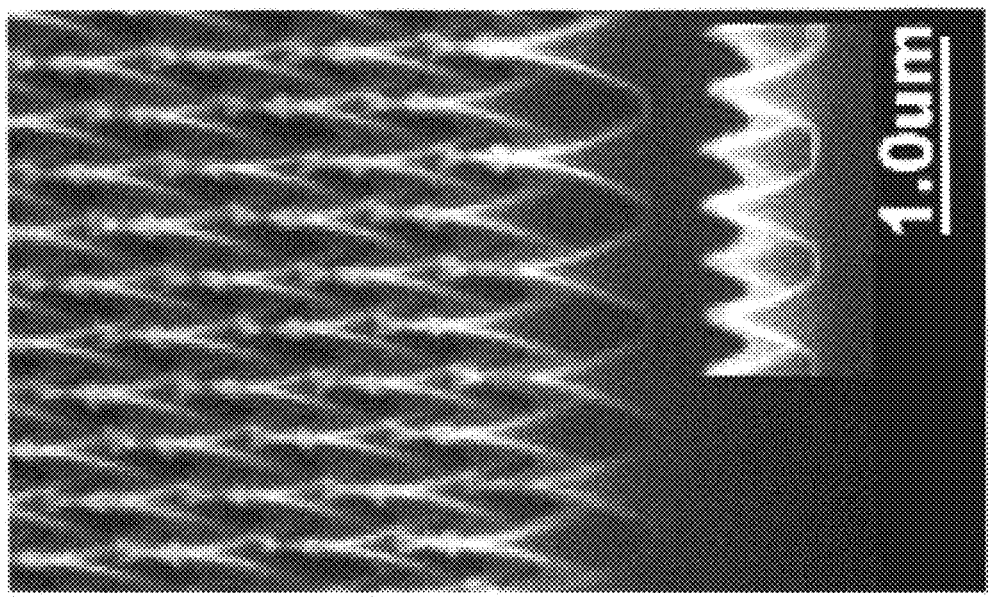
Figure 2:
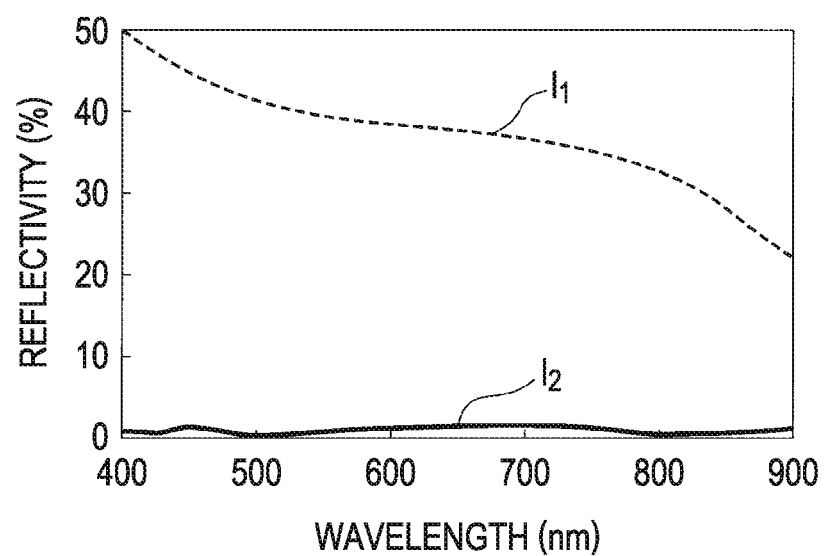
FIG. 2 is a graph showing wavelength dependency of reflectivity of a conventional Si master mold.
Figure 3:
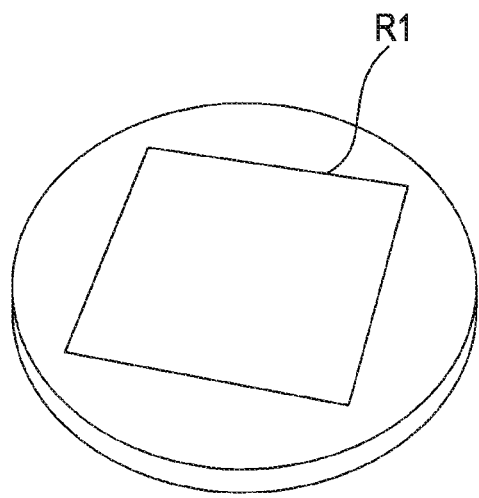
FIG. 3 is a schematic view showing a structure of a Ni-plated stamper of a conventional Si master mold.
Figure 4:
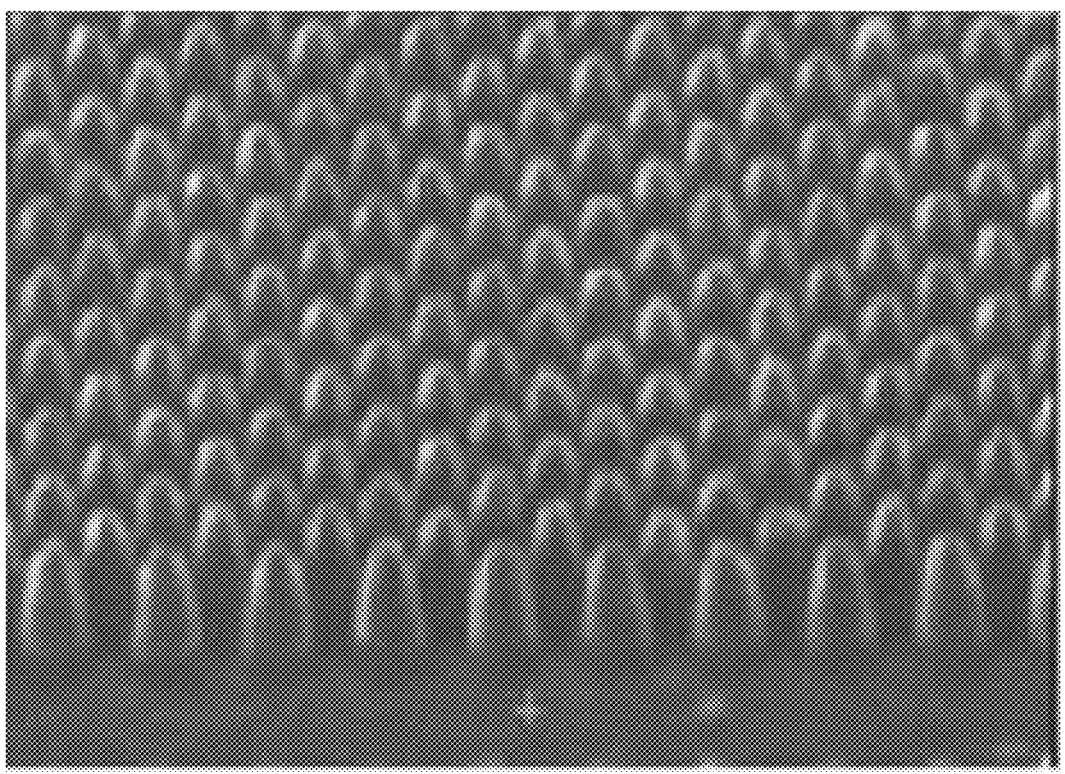
FIG. 4 is a photograph showing an enlarged view of the Ni-plated stamper shown in FIG. 3.
Figure 5:
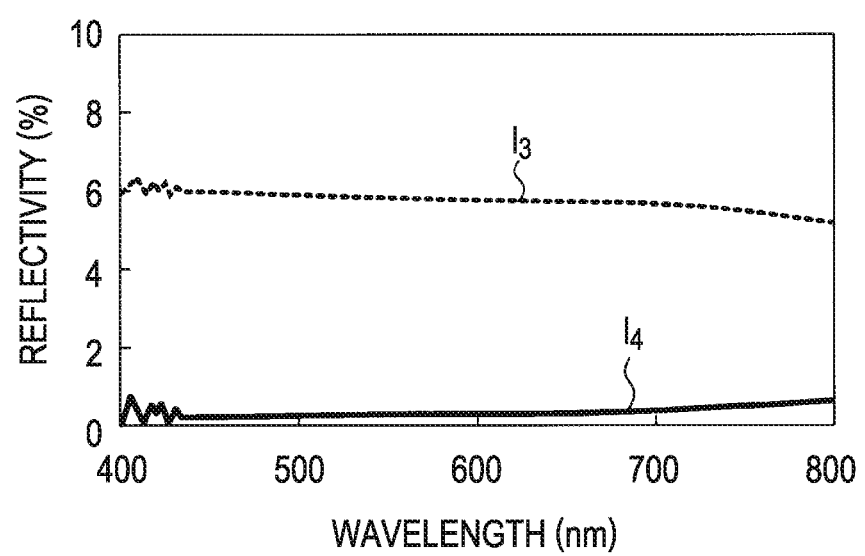
FIG. 5 is a graph showing wavelength dependency of reflectivity of a conventional optical element.
Figure 6:
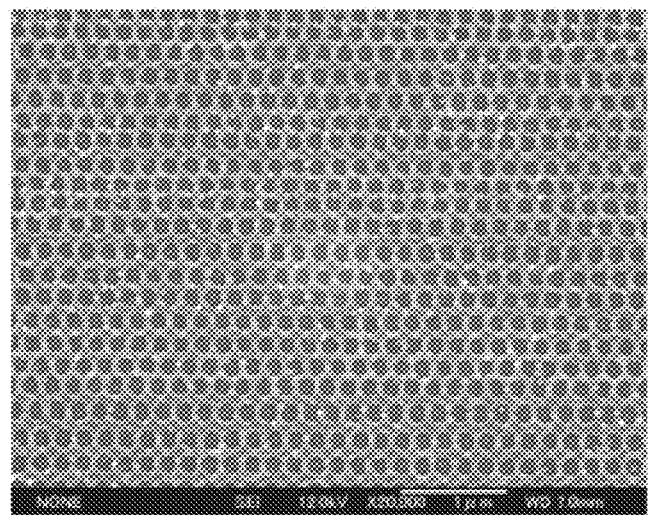
FIG. 6 is a photograph showing a nano-dot pattern formed using a conventional apparatus.
Figure 7:
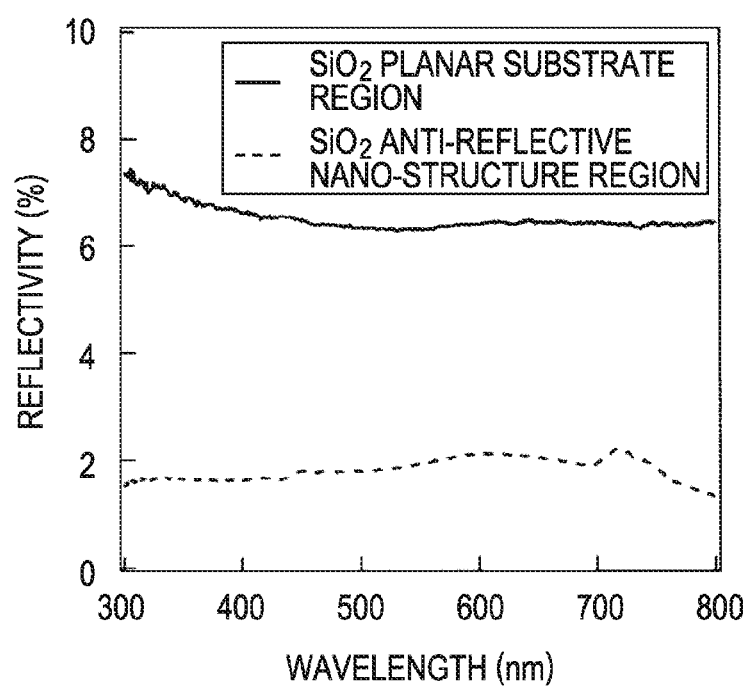
FIG. 7 is a graph showing an example in which a fine structure including a SiO$_2$ disc substrate with a diameter of 12 cm having an anti-reflection function is fabricated to reduce light reflectivity.

The embodiments of the present invention will be described below with reference to the drawings. Note that the same or corresponding portions will be denoted by the same reference numerals throughout the drawings in the embodiments below.

(1) First Embodiment (1-1) Structure of Optical Element

Figure 8A:
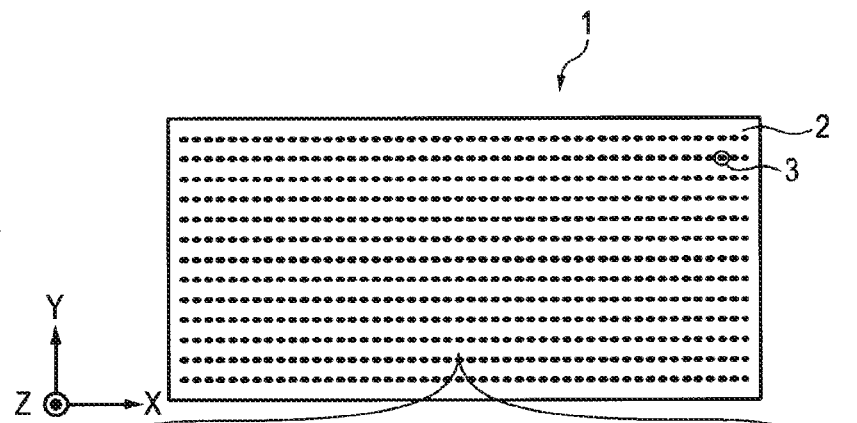
FIG. 8A is a schematic plan view showing an example of a structure of an optical element according to a first embodiment of the present invention.
Figure 8B:
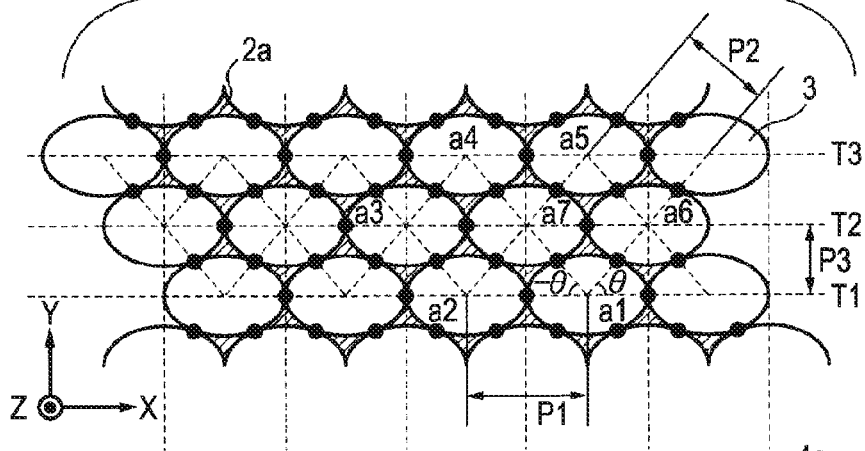
FIG. 8B is a partially enlarged plan view of the optical element shown in FIG. 8A.
Figure 8C:
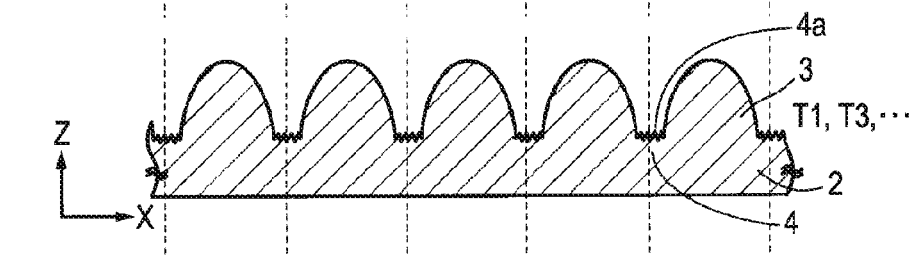
FIG. 8C is a cross-sectional view taken along track T1, T3, . . . shown in FIG. 8B.
Figure 8D:
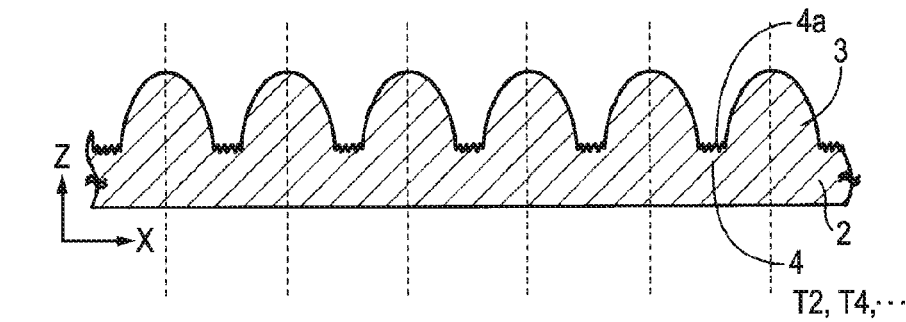
FIG. 8D is a cross-sectional view taken along track T2, T4, . . . shown in FIG. 8B.

FIG. 8A is a schematic plan view showing an example of a structure of an optical element according to a first embodiment of the present invention. FIG. 8B is a partially enlarged plan view of the optical element shown in FIG. 8A. FIG. 8C is a cross-sectional view taken along track T1, T3, . . . shown in FIG. 8B. FIG. 8D is a cross-sectional view taken along track T2, T4, . . . shown in FIG. 8B.

The optical element 1 is suitably used for various optical devices, such as displays, optoelectronic devices, optical communication devices (optical fibers), solar cells, and illuminating devices. For example, the optical element 1 can be used for anti-reflective substrates and light guide plates which are suitable for preventing reflection of light having a visible light wavelength range. Furthermore, the optical element 1 can be used for optical filters having transmittance according to the incident angle of incident light, and backlight systems including the optical filters.

The optical element 1 includes a base 2, and primary structures 3 which are projections and secondary structures 4 disposed on a surface of the base 2. The optical element 1 has a function of preventing reflection of light passing through the base 2 in the Z direction of FIG. 8 from the interfaces between the primary structures 3 and their surrounding air. Here, the term "equal to or smaller than a wavelength of visible light" means a wavelength of about 400 nm or less.

The base 2, the primary structures 3, and the secondary structures 4 constituting the optical element 1 will be described below in that order.

(Base)

The base 2 is a transparent base having transparency. The base 2 is mainly composed of, for example, a transparent synthetic resin, such as polycarbonate (PC) or polyethylene terephthalate (PET), or glass, although the material for the base 2 is not particularly limited thereto. The base 2 may be, for example, in the shape of a film, sheet, plate, or block, although the shape of the base 2 is not particularly limited thereto. Preferably, the shape of the base 2 is appropriately selected depending on the main body of each of various optical devices, such as displays, optoelectronic devices, optical communication devices, solar cells, and illuminating devices, which require predetermined anti-reflection functions, or depending on the shape of a sheet- or film-shaped anti-reflective component attached to each of the optical devices.

(Primary Structure)

Preferably, each primary structure 3 has a cone structure having an elliptic cone shape in which the bottom face is in the shape of an ellipse, an oblong, or an oval with a major axis and a minor axis, and the top has a curved surface; or a cone structure having a truncated elliptic cone shape in which the bottom face is in the shape of an ellipse, an oblong, or an oval with a major axis and a minor axis, and the top has a flat surface. When such a shape is employed, preferably, the primary structure 3 is disposed on the surface of the base such that the major axis of the bottom face of the primary structure 3 is directed in the track extending direction (X direction). In this description, there may be cases where the track extending direction is appropriately referred to as the "track direction".

For example, many primary structures 3 which are projections are periodically arranged on the surface of the base 2 at a pitch substantially equal to the wavelength of visible light. The primary structures 3 of the optical element 1 are arranged on the surface of the base 2 so as to constitute a plurality of rows of tracks T1, T2, T3, . . . (hereinafter, may also be collectively referred to as "tracks T"). Here, the term "track" refers to a portion in which primary structures 3 are linearly arranged in a row. Furthermore, the term "column direction" refers to a direction (Y direction) orthogonal to the track extending direction (X direction) on the formed surface of the base 2.

In this description, the arrangement pitch P1, the arrangement pitch P2, and the arrangement pitch P3 mean as follows:

Arrangement pitch P1: arrangement pitch of primary structures 3 arranged in the track extending direction (X direction)

Arrangement pitch P2: arrangement pitch of primary structures 3 arranged in a ±θ direction with respect to the track extending direction Arrangement pitch P3: arrangement pitch of tracks In the two adjacent tracks T, the primary structures 3 arranged on one track are shifted by half a pitch from the primary structures 3 arranged on the other track. Specifically, in the two adjacent tracks T, at the intermediate positions (at the positions shifted by half a pitch) between the primary structures 3 arranged on one track (e.g., T1), the primary structures 3 on the other track (e.g., T2) are disposed. As a result, as shown in FIG. 8B, in the three adjacent rows of tracks (T1 to T3), primary structures 3 are arranged so as to form a hexagonal lattice pattern or a quasi-hexagonal lattice pattern with the centers of the primary structures 3 being positioned at points a1 to a7. The term "quasi-hexagonal lattice pattern" means, unlike a regular hexagonal lattice pattern, a hexagonal lattice pattern which is stretched and distorted in the track extending direction (X direction).

When the primary structures 3 are arranged so as to form a quasi-hexagonal lattice pattern, as shown in FIG. 8B, the arrangement pitch P1 (distance between a1 and a2) of the primary structures 3 on the same track (e.g., T1) is longer than the arrangement pitch of the primary structures 3 between the two adjacent tracks (e.g., T1 and T2), that is, the arrangement pitch P2 (e.g., distance between a1 and a7 or a2 and a7) of the primary structures 3 in the θ direction with respect to the track extending direction. By arranging the primary structures 3 in such a manner, the packing density of the primary structures 3 can be further improved.

The height (depth) of the primary structure 3 is not particularly limited, and is appropriately set according to the wavelength range of light to be transmitted, for example, in the range of about 236 to 450 nm. The aspect ratio (height H/arrangement pitch P) of the primary structures 3 is preferably set in the range of 0.81 to 1.46, and more preferably in the range of 0.94 to 1.28. The reason for this is that if the aspect ratio is less than 0.81, the reflection characteristics and transmission characteristics tend to decrease; and if the aspect ratio exceeds 1.46, the releasing property is decreased during fabrication of the optical element 1 and it tends to be difficult to remove a replicated replica properly.

Furthermore, from the standpoint of further improving the reflection characteristics, the aspect ratio of the primary structures 3 is preferably set in the range of 0.94 to 1.46. Furthermore, from the standpoint of further improving the transmission characteristics, the aspect ratio of the primary structures 3 is preferably set in the range of 0.81 to 1.28.

In the present invention, the aspect ratio is defined by expression (1) below:

$$\text{Aspect ratio} = H/P \tag{1}$$

where H is the height of the primary structures 3, and P is the average arrangement pitch (average period), the average arrangement pitch P being defined by expression (2) below:

$$\text{Average arrangement pitch } P = (P1 + P2 + P2)/3 \tag{2}$$

where P1 is the arrangement pitch in the track extending direction (period in the track extending direction), and P2 is the arrangement pitch in a ±θ direction with respect to the track extending direction (where θ=60°−δ, where preferably 0°<δ≤11°, and more preferably 3°≤δ≤6°) (period in the θ direction).

Furthermore, the height H of the primary structures 3 is defined as the height in the column direction of the primary structures 3. The height in the track extending direction of the primary structures 3 is smaller than the height in the column direction. Furthermore, the height of portions other than the portions located between the primary structures 3 or portions located in the track extending direction of the primary structures 3 is substantially the same as the height in the column direction. Therefore, the height of the primary structures 3 is represented by the height in the column direction. However, in the case where the primary structures 3 are depressions, the height H of the primary structures 3 in the expression (1) is considered as the depth H of the primary structures 3.

The shape of the primary structures 3 is not limited to the projections shown in the drawing, and the primary structures 3 may be depressions disposed in the surface of the base 2. The height of the primary structures 3 is not particularly limited, and, for example, is about 420 nm, more specifically 236 to 450 nm. When the primary structures 3 have a depression shape, the depth of the primary structures 3 is considered instead of the height.

In such a primary structure 3, in view of the anti-reflection function, preferably, the refractive index changes smoothly in the depth (z) direction. For example, in the elliptic cone or truncated elliptic cone shape including a parabolic curved surface, the refractive index changes linearly with z in the depth direction, and the refraction index can be changed smoothly. Furthermore, in such a case, since the shape of the top of the primary structure 3 is not sharp, durability sufficient for practical use can be obtained. In a primary structure 3 having a cone shape or a quadrangular pyramid shape, the refractive index changes in proportion to the square of z in the depth direction. In such a case, since the shape of the top of the primary structure 3 is sharp, durability is degraded, and reflectivity on the long wavelength side is degraded. Therefore, a refractive index profile in which n(z) changes at the middle level between the change in the case of a parabolic curved surface and the change in the case of a conical curved surface is preferable. In the optical element including the primary structures having the elliptic cone or truncated elliptic cone shape and provided with the secondary structures 4, since such a gentle refractive index profile can be attained, satisfactory durability can be achieved and excellent anti-reflection characteristics can be obtained.

In FIG. 8, the primary structures 3 have the same shape. However, the shape of the primary structures 3 is not limited thereto. The primary structures 3 having two or more different shapes may be disposed on the surface of the base. Furthermore, the primary structures 3 may be integrally formed with the base 2.

In addition, the primary structures 3 may not necessarily have the same aspect ratio. The primary structures 3 may be configured so as to have a certain height distribution (for example, an aspect ratio in the range of about 0.83 to 1.46). By providing the primary structures 3 having the height distribution, wavelength dependency of reflection characteristics can be reduced. Consequently, the optical element 1 having excellent anti-reflection characteristics can be realized.

The term "height distribution" means that the primary structures 3 having two or more different heights (depths) are provided on the surface of the base 2. That is, it means that primary structures 3 having a reference height and primary structures 3 having a height different from the reference height are provided on the surface of the base 2. The primary structures 3 having a height different from the reference height are provided, for example, on the surface of the base 2 periodically or aperiodically (random). As the direction of the periodicity, for example, the track extending direction, the column direction, or the like may be mentioned.

(Secondary Structure)

The secondary structures 4 are structures having a smaller height than the primary structures 3 and, for example, are fine protruding portions. Furthermore, when the height of the secondary structures 4 is an optical path length selected in consideration of the refractive index and is about a quarter or less of the wavelength used, an anti-reflection function can be provided, and the height of the secondary structures 4 is, for example, about 10 to 150 nm. As the material for the secondary structures 4, for example, the same material as that for the base 2 and the primary structures 3 may be used, but preferably, a material having a lower refractive index than the base 2 and the primary structures 3 is used. The reason for this is that the reflectivity can be further reduced. In the above, description has been made mainly of the case where both the primary structures 3 and the secondary structures 4 are projections. However, projections and depressions may be reversed, and both the primary structures 3 and the secondary structures 4 may be depressions. Furthermore, the projection-depression relationship may be reversed between the primary structures 3 and the secondary structures 4. Specifically, when the primary structures 3 are projections, the secondary structures 4 may be depressions. When the primary structures 3 are depressions, the secondary structures 4 may be projections.

The secondary structures 4 are, for example, disposed between the primary structures 3. Specifically, preferably, the secondary structures 4 are provided on the most adjacent portions of the primary structures 3, and the primary structures 3 are connected to one another by the secondary structures 4 provided on the most adjacent portions. In such a manner, the packing density of the primary structures 3 can be improved. Furthermore, preferably, the spatial frequency component of the secondary structures 4 is higher than the frequency component converted from the period of the primary structures 3. Specifically, the spatial frequency component of the secondary structures 4 is preferably two times or more, and more preferably four times or more the frequency component converted from the period of the primary structures 3. Preferably, the spatial frequency component of the secondary structures 4 is not an integral multiple of the frequency component of the primary structures 3.

From the standpoint of ease of formation of the secondary structures 4, as shown in FIG. 8B, the secondary structures 4 are preferably arranged at positions indicated by black circles where the primary structures 3 of an elliptic cone shape, a truncated elliptic cone shape, or the like lie adjacent to one another. In such an arrangement, the secondary structures 4 may be formed on all the adjacent portions of the primary structures 3 or formed only in the track, such as T1 or T2, extending direction. When the primary structures 3 are arranged periodically in a hexagonal lattice pattern or in a quasi-hexagonal lattice pattern, for example, the primary structures 3 lie adjacent to one another along orientations of 6-fold symmetry. In such a case, preferably, the secondary structures 4 are provided on the adjacent portions, and the primary structures 3 are connected to one another by the secondary structures 4. Furthermore, from the standpoint of improving the packing density, preferably, the secondary structures 4 are formed in the gaps 2a, shown in FIG. 8B, between the primary structures 3. The secondary structures 4 may be formed both in the adjacent portions of the primary structures 3 and in the gaps 2a. Furthermore, the positions at which the secondary structures 4 are formed are not particularly limited to the examples described above. The secondary structures 4 may be formed on the entire surfaces of the primary structures 3.

Furthermore, from the standpoint of improving the reflection characteristics and transmission characteristics, preferably, at least one type of fine projections and depressions, for example, fine projection-depression portions 4a are formed on the surfaces of the secondary structures 4.

Figure 9:
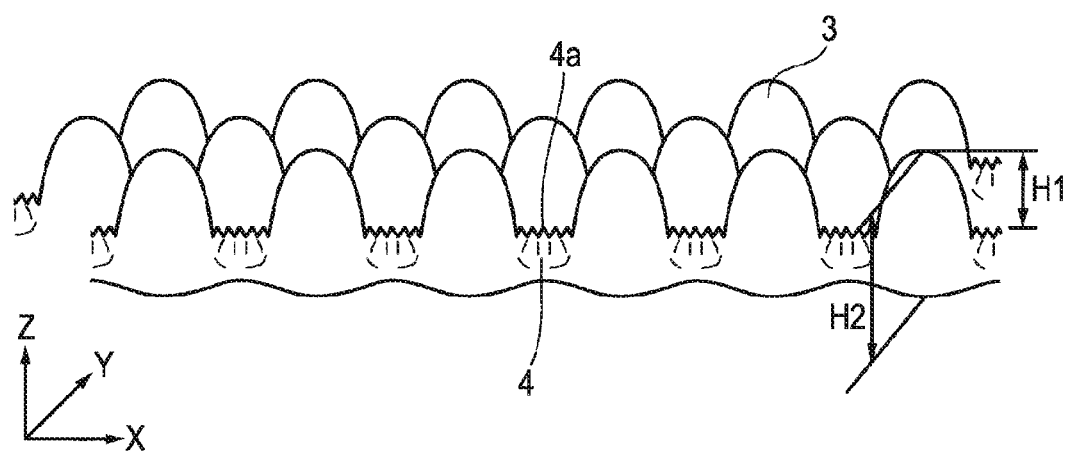
FIG. 9 is a partially enlarged perspective view showing the optical element shown in FIG. 8A.

Furthermore, in order to obtain the optical element 1 having a good anti-reflection function and small wavelength dependency, fine projections or depressions of the secondary structures 4 are preferably formed so as to have a spatial frequency component of high-frequency wave shorter than the period of the primary structures 3. For example, preferably, the secondary structures 4 include corrugated, fine projection-depression portions 4a having fine depressions and projections as shown in FIG. 9. The fine projection-depression portions 4a can be formed, for example, by appropriately selecting the etching conditions, such as RIE (Reactive Ion Etching), in the optical element fabrication process, which will be described later, or the material for the master. Specifically, as the material for the master, Pyrex glass is preferably used.

Figure 10A:
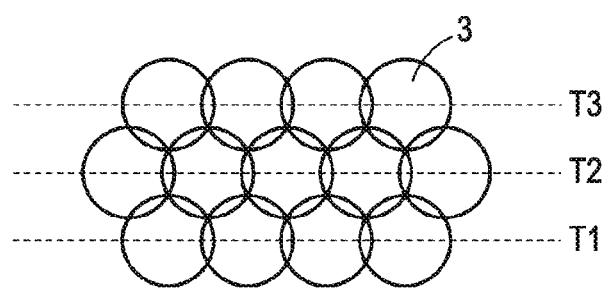
FIGS. 10A and 10B are schematic views each showing an example of an arrangement of primary structures.
Figure 10B:
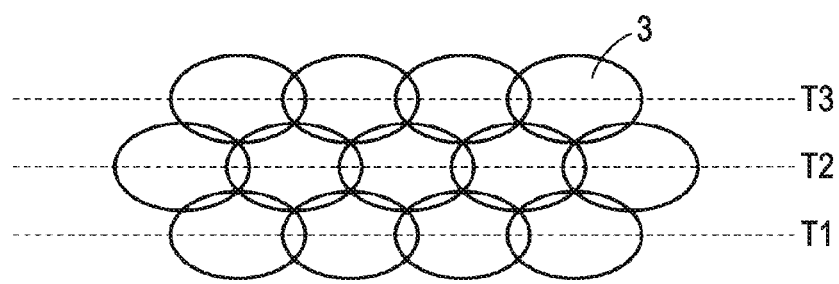

Although the case where the secondary structures 4 are provided has been described in the above example, a configuration may be employed in which, for example, in the portions where the primary structures 3 of an elliptic cone shape or a truncated elliptic cone shape are in contact with one another, lower parts of the primary structures 3, corresponding to about a quarter or less of the optical path length, have a larger shape than the period (refer to FIGS. 10A and 10B). That is, instead of providing the secondary structures 4, a configuration may be employed in which lower parts of the adjacent primary structures 3 are overlapped with one another. Furthermore, in such a case, as the arrangement of the primary structures 3, an elliptic shape such as the one shown in FIG. 8B is preferable. In such a manner, by increasing the number of junctions to six, the packing density can be increased. Furthermore, it is possible to change the refractive index profile smoothly from the top of each structure toward the depth direction.

In addition, a configuration may be employed in which lower parts of the adjacent primary structures 3 are overlapped with one another, and the secondary structures 4 are formed on the surface of the base 2.

(1-2) Structure of Roll Master

Figure 11A:
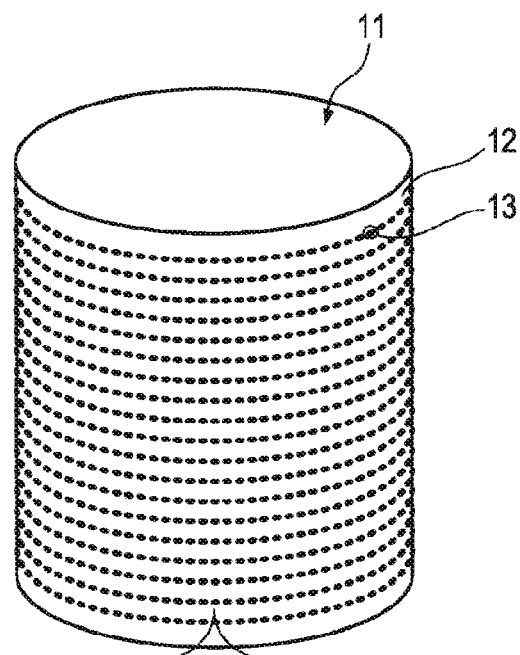
FIG. 11A is a perspective view showing an example of a structure of a roll master.
Figure 11B:
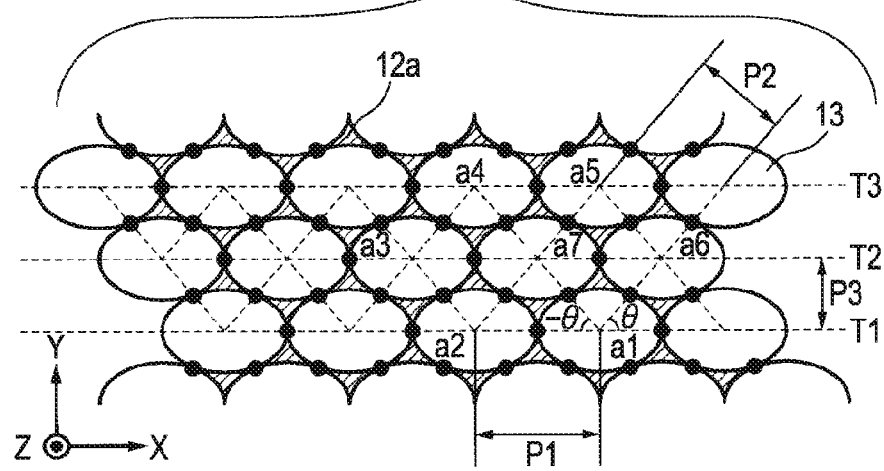
FIG. 11B is a partially enlarged plan view showing the roll master shown in FIG. 11A.

FIG. 11 shows an example of a structure of a roll master used to fabricate the optical element having the structure described above. As shown in FIG. 11, a roll master 11 has a structure in which many primary structures 13 which are depressions are arranged on a surface of a cylindrical master 12 with gaps 12a therebetween at a pitch substantially equal to the wavelength of visible light. The primary structures 13 are used for forming primary structures 3 which are projections on the base. Although not shown in the drawing, secondary structures which are depressions shallower than the primary structures 13 are formed on the surface of the cylindrical master 12. The secondary structures are used for forming secondary structures 4 which are projections on the base. The secondary structures 4 are preferably arranged at positions indicated by black circles where the primary structures 13, for example, of an elliptic cone shape, a truncated elliptic cone shape, or the like lie adjacent to one another.

As the material for the master 12, for example, glass can be used, although the material is not limited thereto. Using a roll master exposure apparatus, which will be described later, by synchronizing a polarity inversion formatter signal to a rotation controller of a recording apparatus to generate a signal for each track and performing patterning at CAV and at an appropriate feed pitch so that two-dimensional patterns are spatially linked to one another, it is possible to record a hexagonal lattice pattern or a quasi-hexagonal lattice pattern. By appropriately setting the frequency of the polarity inversion formatter signal and the number of revolutions of the roll, a lattice pattern having a uniform spatial frequency is formed in a desired recording region.

(1-3) Method for Fabricating Optical Element

Figure 12:
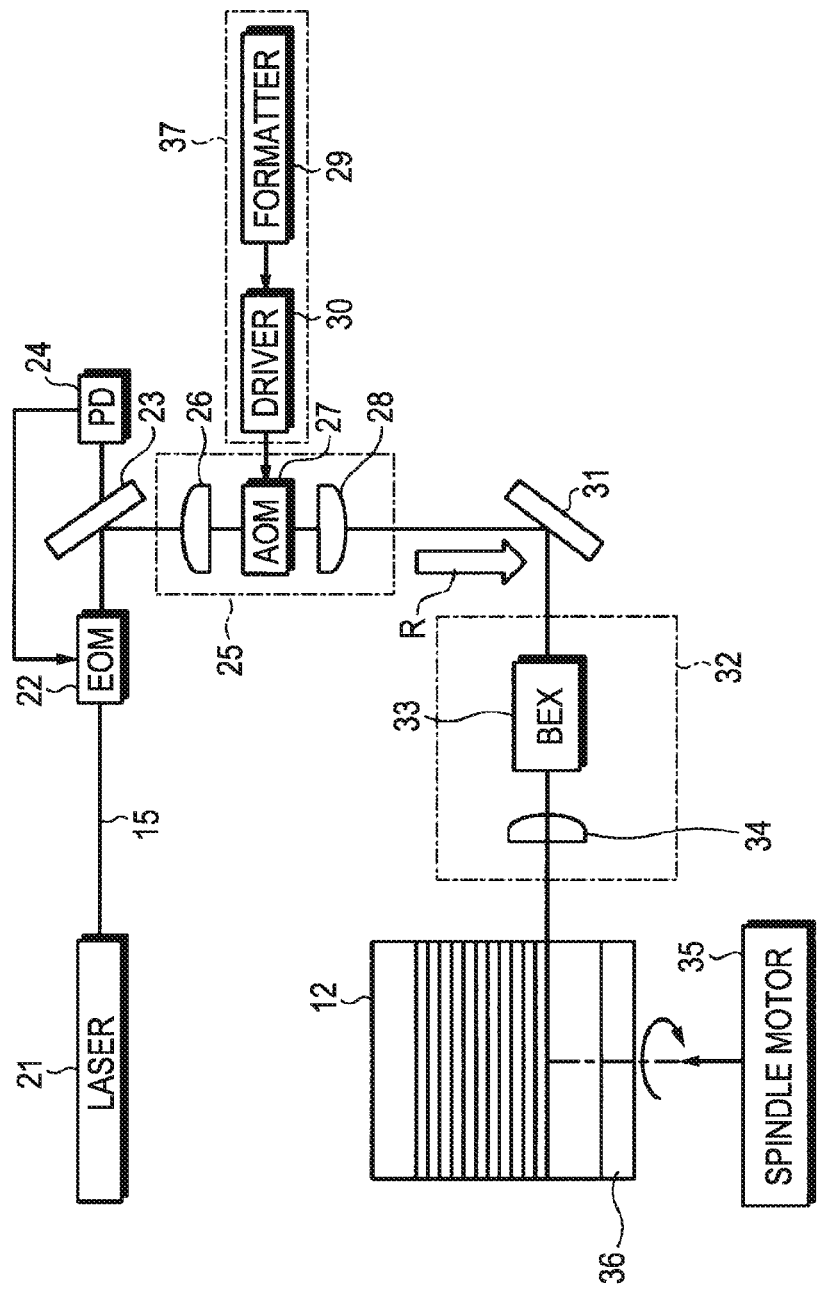
FIG. 12 is a schematic view showing an example of a structure of an exposure apparatus.

Next, with reference to FIGS. 12 to 14, an example of a method for fabricating an optical element having the structure described above will be described.

A method for fabricating an optical element according to the first embodiment includes a resist layer formation step of forming a resist layer on a master, an exposure step of forming a latent image of a moth-eye pattern on the resist layer using a roll master exposure apparatus, a development step of developing the resist layer provided with the latent image, an etching step of producing a roll master using plasma etching, and a replication step of producing a replica substrate using an ultraviolet curable resin.

(Structure of Exposure Apparatus)

First, with reference to FIG. 12, the structure of a roll master exposure apparatus used in the moth-eye pattern exposure step will be described. The roll master exposure apparatus is configured on the basis of an optical disc recording apparatus.

A laser light source 21 is a light source for exposing a resist layer formed on a surface of a master 12 as a recording medium, and oscillates, for example, a laser beam 15 for recording with a wavelength λ, of 266 nm. The laser beam 15 emitted from the laser light source 21, as a collimated beam, travels in a straight line to enter an electro-optical modulator (EOM) 22. The laser beam 15 transmitted through the electro-optical modulator 22 is reflected from a mirror 23 and then guided to an optical modulation system 25.

The mirror 23 includes a polarization beam splitter, and has a function of reflecting one polarized component and transmitting the other polarized component. The polarized component transmitted through the mirror 23 is received by a photodiode 24, and the electro-optical modulator 22 is controlled on the basis of the signal of the received polarized component to perform phase modulation of the laser beam 15.

In the optical modulation system 25, the laser beam 15 is focused by a collective lens 26 on an acoust-optical modulator (AOM) 27 composed of glass ($SiO_2$) or the like. The laser beam 15 is intensity-modulated by the acoust-optical modulator 27 and dispersed, and then collimated by a lens 28. The laser beam 15 emitted from the optical modulation system 25 is reflected from a mirror 31 and guided onto a moving optical table 32 horizontally and in parallel.

The moving optical table 32 includes a beam expander 33 and an objective lens 34. The laser beam 15 guided to the moving optical table 32 is shaped into a desired beam form by the beam expander 33, and then irradiates the resist layer on the master 12 through the objective lens 34. The master 12 is placed on a turntable 36 connected to a spindle motor 35. While rotating the master 12 and moving the laser beam 15 in the height direction of the master 12, the resist layer is intermittently irradiated by the laser beam 15 to perform an exposure step of the resist layer. The resulting latent image has, for example, a substantially elliptical shape having a major axis in the circumferential direction. The laser beam 15 is moved by moving the moving optical table 32 in the direction indicated by arrow R.

The exposure apparatus includes a control mechanism 37 for forming a latent image corresponding to the two-dimensional pattern of the hexagonal lattice or quasi-hexagonal lattice pattern shown in FIG. 8B. The control mechanism 37 includes a formatter 29 and a driver 30. The formatter 29 includes a polarity inversion unit, and the polarity inversion unit controls the irradiation timing of the resist layer with the laser beam 15. The driver 30 controls the acoust-optical modulator 27 in response to the output from the polarity inversion unit.

In the roll master exposure apparatus, a polarity inversion formatter signal is synchronized to the rotation controller of the recording apparatus to generate a signal for each track so that two-dimensional patterns are spatially linked to one another, and intensity modulation is performed by the acoust-optical modulator 27. By performing patterning at constant angular velocity (CAV) and at an appropriate number of revolutions, an appropriate modulation frequency, and an appropriate feed pitch, it is possible to record a hexagonal lattice pattern or a quasi-hexagonal lattice pattern.

The individual steps in the method for fabricating the optical element according to the first embodiment of the present invention will be described in order below.

(Resist Layer Formation Step)

Figure 13A:
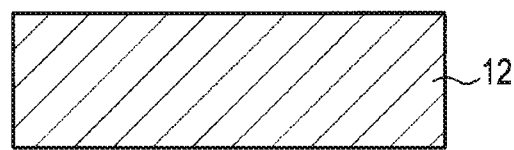
FIGS. 13A to 13C are views illustrating processes of an example of a method for fabricating an optical element according to the first embodiment of the present invention.
Figure 13B:
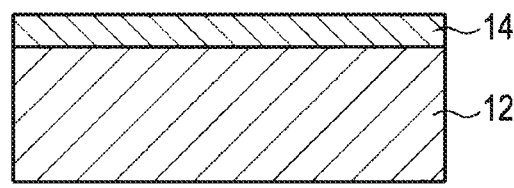

First, as shown in FIG. 13A, a cylindrical master 12 is prepared. The master 12 is, for example, a glass master. Next, as shown in FIG. 13B, a resist layer 14 is formed on a surface of the master 12. As the material for the resist layer 14, for example, either an organic resist or an inorganic resist may be used. As the organic resist, for example, a novolac resist or a chemically-amplified resist can be used. Furthermore, as the inorganic resist, for example, a metal oxide containing one, or two or more transition metals can be used.

(Exposure Step)

Figure 13C:
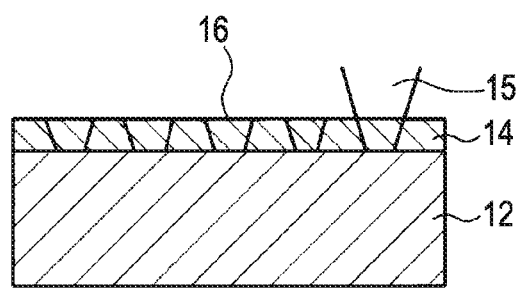

Next, as shown in FIG. 13C, using the roll master exposure apparatus described above, while rotating the master 12, the resist layer 14 is irradiated with the laser beam (exposure beam) 15. In this step, while moving the laser beam 15 in the height direction of the master 12, the resist layer 14 is intermittently irradiated by the laser beam 15 to expose the entire surface of the resist layer 14. As a result, a latent image 16 following the trajectory of the laser beam 15 is formed over the entire surface of the resist layer 14 at a pitch substantially equal to the wavelength of visible light.
(Development Step)

Next, while rotating the master 12, a developer is dropwise applied onto the resist layer 14. Thereby, the resist layer 14 is subjected to development treatment as shown in FIG. 14A. As shown in the drawing, in the case where the resist layer 14 is formed using a positive resist, an exposed portion exposed to the laser beam 15 has an increased rate of dissolution in the developer compared with a non-exposed portion. As a result, a pattern corresponding to the latent image (exposed portion) 16 is formed on the resist layer 14.
(Etching Step)

Next, using, as a mask, the pattern of the resist layer 14 (resist pattern) formed on the master 12, the surface of the master 12 is subjected to etching treatment. Thereby, as shown in FIG. 14B, it is possible to obtain depressions of an elliptic cone shape or a truncated elliptic cone shape having a major axis directed in the track extending direction, i.e., primary structures 13. As the etching method, for example, dry etching is performed. In this step, by alternately carrying out etching treatment and ashing treatment, for example, a pattern of conical primary structures 13 can be formed, and also a glass master having a depth three times or more of the resist layer 14 (selectivity: 3 or more) can be produced to achieve a high aspect ratio of the primary structures 3. Thereby, a roll master 11 having a hexagonal lattice pattern or a quasi-hexagonal lattice pattern can be obtained.
(Replication Step)

Next, the roll master 11 and an acrylic sheet or the like to which an ultraviolet curable resin has been applied are brought into close contact with each other, and while curing the resin by irradiation with ultraviolet light, the sheet is detached from the roll master. Thereby, as shown in FIG. 14C, an intended optical element 1 is produced.

According to the first embodiment, the primary structures 3 are formed on the surface of the base such that the primary structures 3 are periodically repeated at a fine pitch equal to or smaller than the wavelength of visible light and constitute a plurality of rows of tracks, and the secondary structures 4 smaller in size than the primary structures 3 are disposed on the surface of the base. Therefore, it is possible to realize an optical element 1 having high productivity and excellent anti-reflection characteristics.

(2) Second Embodiment (2-1) Structure of Optical Element

Figure 15A:
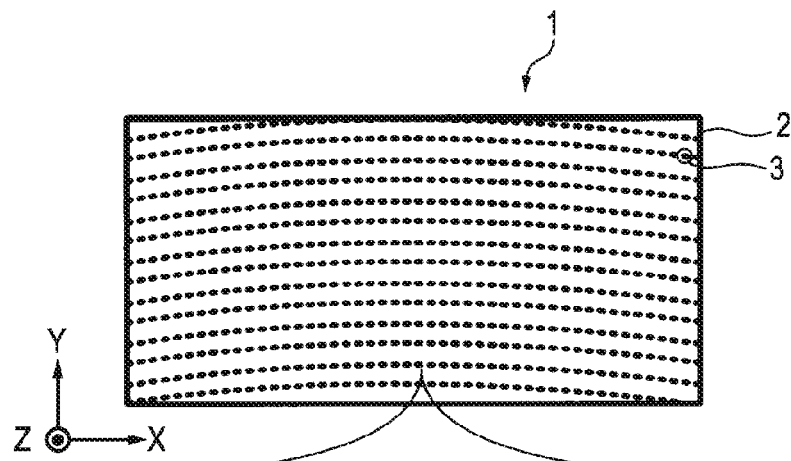
FIG. 15A is a schematic plan view showing an example of a structure of an optical element according to a second embodiment of the present invention.
Figure 15B:
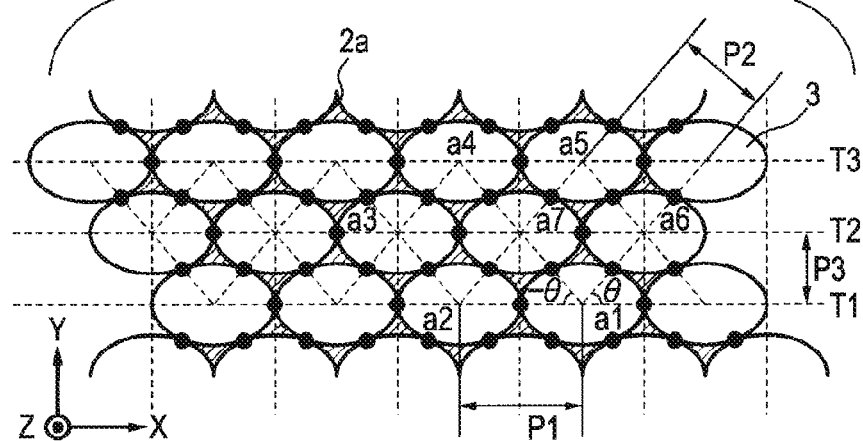
FIG. 15B is a partially enlarged plan view of the optical element shown in FIG. 15A.
Figure 15C:
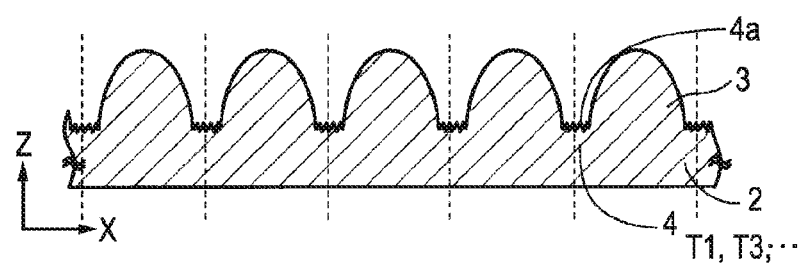
FIG. 15C is a cross-sectional view taken along track T1, T3, . . . shown in FIG. 15B.
Figure 15D:
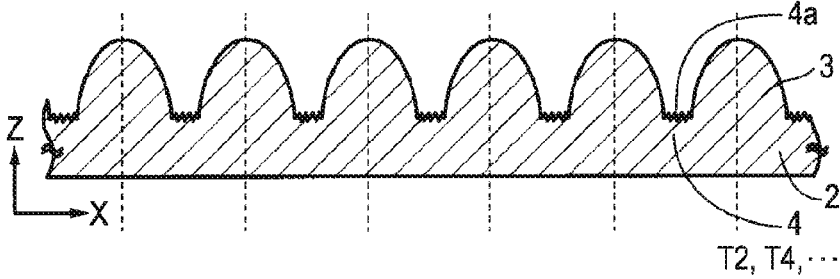
FIG. 15D is a cross-sectional view taken along track T2, T4, . . . shown in FIG. 15B.

FIG. 15A is a schematic plan view showing an example of a structure of an optical element according to a second embodiment of the present invention. FIG. 15B is a partially enlarged plan view of the optical element shown in FIG. 15A. FIG. 15C is a cross-sectional view taken along track T1, T3, . . . shown in FIG. 15B. FIG. 15D is a cross-sectional view taken along track T2, T4, . . . shown in FIG. 15B.

In an optical element 1 according to the second embodiment, tracks T have an arc shape and primary structures 3 are arranged in an arc shape. As shown in FIG. 15B, in the three adjacent rows of tracks (T1 to T3), primary structures 3 are arranged to form a quasi-hexagonal lattice pattern with the centers of the primary structures 3 being positioned at points a1 to a7. The term "quasi-hexagonal lattice pattern" means, unlike a regular hexagonal lattice pattern, a hexagonal lattice pattern which is distorted along the arc shape of the tracks T, or means, unlike a regular hexagonal lattice pattern, a hexagonal lattice pattern which is distorted along the arc shape of the tracks T and stretched and distorted in the track extending direction (X direction).

Except for what has been described above, the structure of the optical element 1 is the same as that in the first embodiment, and the description thereof will be omitted.

(2-2) Structure of Disc Master

Figure 16A:
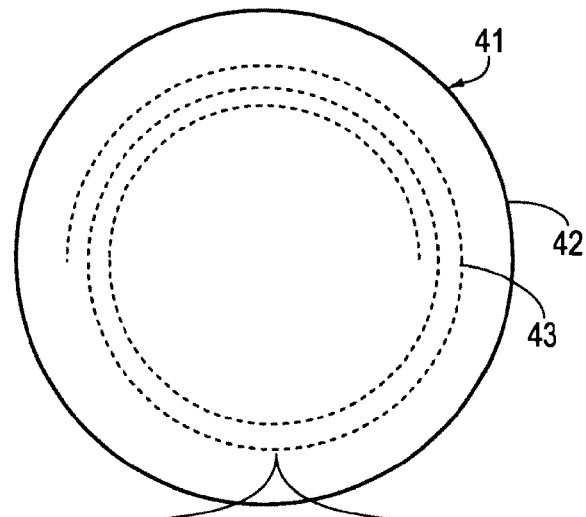
FIG. 16A is a perspective view showing an example of a structure of a disc master.
Figure 16B:
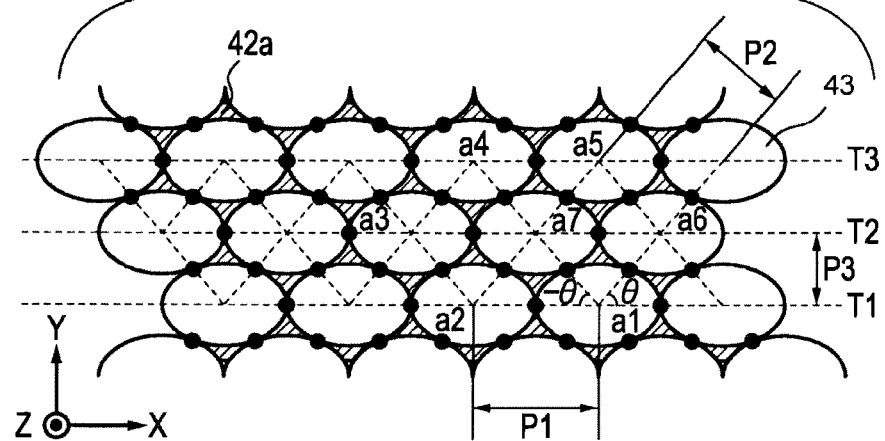
FIG. 16B is a partially enlarged plan view showing the disc master shown in FIG. 16A.

FIG. 16 shows an example of the structure of a disc master for fabricating the optical element having the structure described above. As shown in FIG. 16, a disc master 41 has a structure in which many primary structures 43 which are depressions and gaps 42a therebetween are arranged on a surface of a disc-shaped master 42 at a pitch substantially equal to the wavelength of visible light. The primary structures 42 are disposed on concentric or spiral tracks.

Except for what has been described above, the structure of the disc master 41 is the same as that of the roll master 11 in the first embodiment, and the description thereof will be omitted.

(2-3) Method for Fabricating Optical Element

Figure 17:
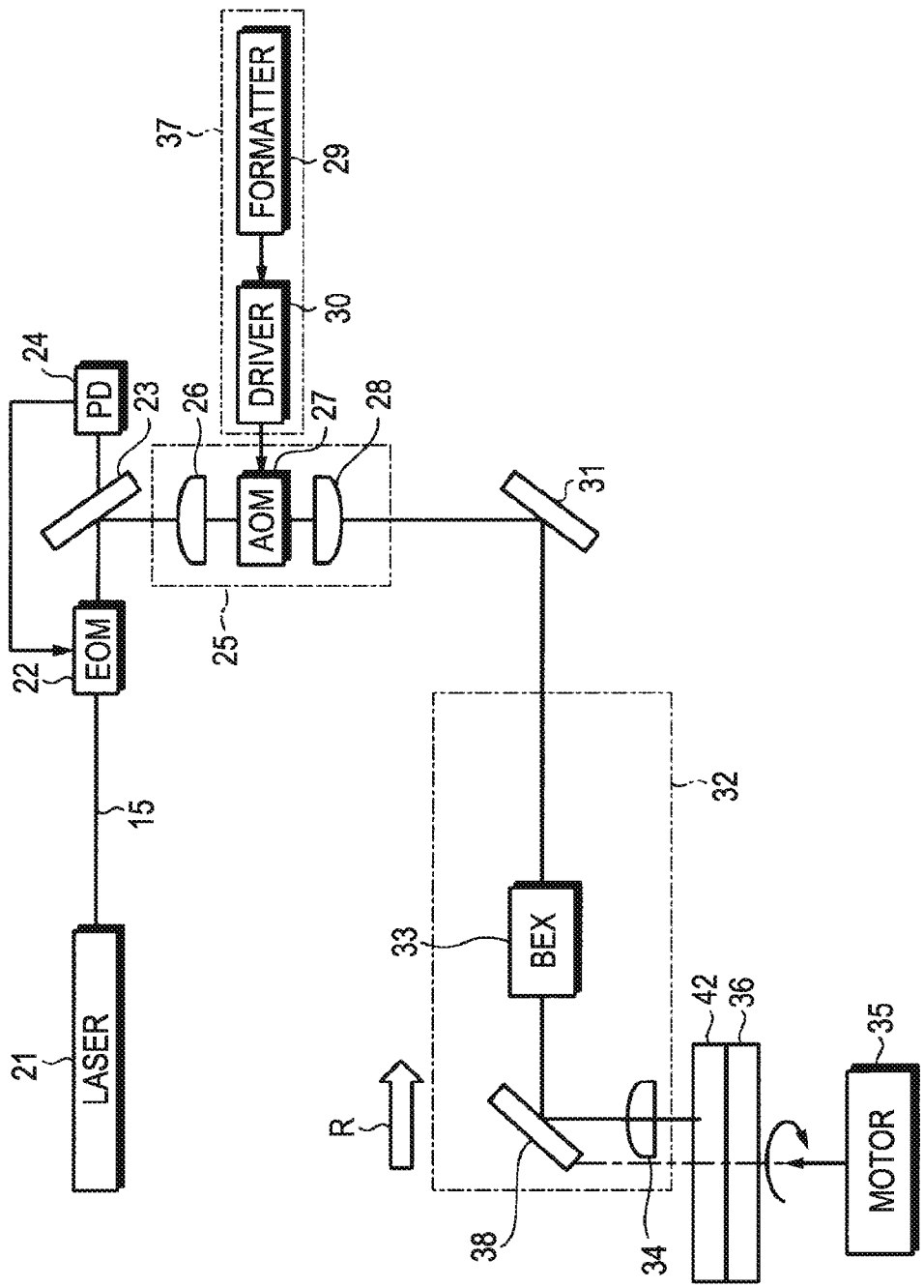
FIG. 17 is a schematic view showing an example of a structure of an exposure apparatus.

FIG. 17 is a schematic view showing an example of an exposure apparatus used for producing a disc master having the structure described above.

A moving optical table 32 includes a beam expander 33, a mirror 38, and an objective lens 34. The laser beam 13 guided to the moving optical table 32 is shaped into a desired beam form by the beam expander 33, and then irradiates the resist layer on the disc-shaped master 42 through the mirror 38 and the objective lens 34. The master 42 is placed on a turntable (not shown) connected to a spindle motor 35. While rotating the master 42 and moving the laser beam 15 in the radial direction of rotation of the master 42, the resist layer on the master 42 is intermittently irradiated by the laser beam to perform an exposure step of the resist layer. The resulting latent image has a substantially elliptical shape having a major axis in the circumferential direction. The laser beam 15 is moved by moving the moving optical table 32 in the direction indicated by arrow R.

The exposure apparatus shown in FIG. 17 includes a control mechanism 37 for forming a latent image corresponding to the two-dimensional pattern of the hexagonal lattice or quasi-hexagonal lattice pattern shown in FIG. 16. The control mechanism 37 includes a polarity inversion unit which controls the irradiation timing of the resist layer with the laser beam 15 and a driver 30 which controls an AOM 27 in response to the output from the polarity inversion unit.

The control mechanism 37 synchronizes the intensity modulation of the laser beam 15 by the AOM 27, the driving rotational speed of the spindle motor 35, and the moving speed of the moving optical table 32 for each track so that the two-dimensional patterns of the latent image are spatially linked to one another. The master 42 is controlled to be rotated at a constant angular velocity (CAV). Patterning is performed at an appropriate number of revolutions of the master 42 by the spindle motor 35, at appropriate frequency modulation of laser intensity by the AOM 27, and at an appropriate feed pitch of the laser beam 15 by the moving optical table 32. Thereby, a latent image of a hexagonal lattice pattern or a quasi-hexagonal lattice pattern is formed on the resist layer.

For example, in order to obtain an arrangement pitch P1 in the circumferential direction of 330 nm and an arrangement pitch P2 in the direction at about 60° (in the direction at about) −60° with respect to the circumferential direction of 300 nm, the feed pitch is set at 251 nm. Meanwhile, in order to obtain P1 of 315 nm and P2 of 275 nm, the feed pitch is set at 226 nm. Furthermore, in order to obtain P1 of 300 nm and P2 of 265 nm, the feed pitch is set at 219 nm.

Furthermore, the control signal of the polarity inversion unit is gradually changed such that the spatial frequency (pattern density of the latent image: P1: 330, P2: 300 nm; or P1: 315 nm, P2: 275 nm; or P1: 300 nm, P2: 265 nm) becomes uniform. More specifically, exposure is performed while changing an irradiation period of the laser beam 15 on the resist layer for each track, and frequency modulation of the laser beam 15 is performed by the control mechanism 37 such that P1 becomes about 330 nm (or 315 nm, 300 nm) on each track T. That is, the modulation is controlled such that the irradiation period of the laser beam becomes shorter as the track position becomes distant from the center of the disc-shaped master 42. Thereby, it is possible to form a nano-pattern in which the spatial frequency is uniform over the entire substrate.

Except for what has been described above, the method for fabricating the optical element is the same as that in the first embodiment, and the description thereof will be omitted.

According to the second embodiment, as in the case where the primary structures 3 are linearly arranged, it is possible to obtain an optical element 1 having excellent transmittance and reflectivity.

(3) Third Embodiment

Figure 18A:
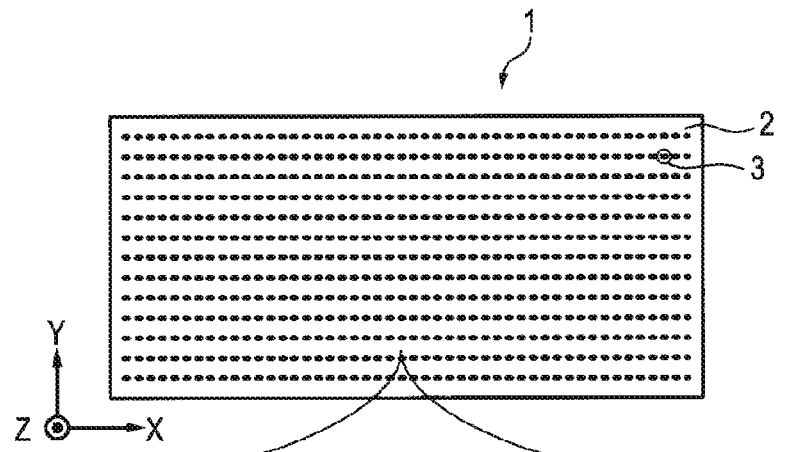
FIG. 18A is a schematic plan view showing an example of a structure of an optical element according to a third embodiment of the present invention.
Figure 18B:
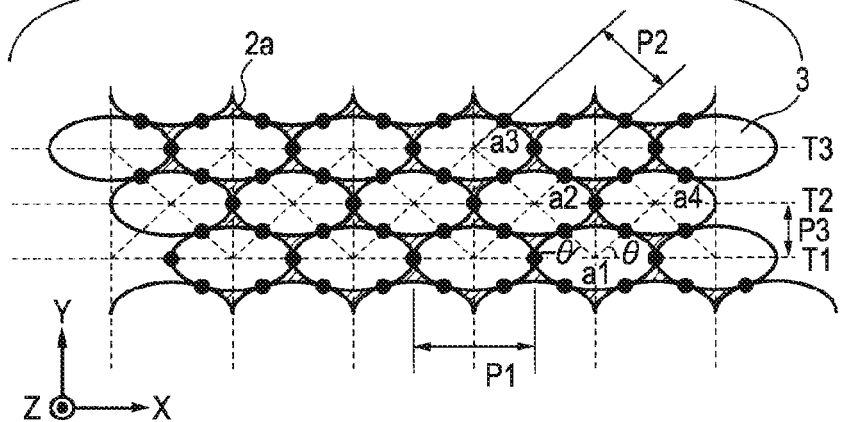
FIG. 18B is a partially enlarged plan view of the optical element shown in FIG. 18A.
Figure 18C:
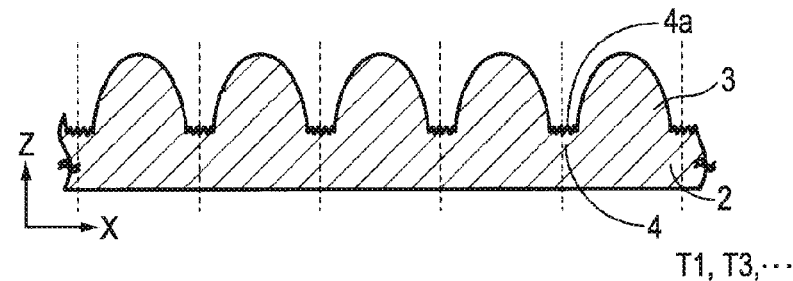
FIG. 18C is a cross-sectional view taken along track T1, T3, . . . shown in FIG. 18B.
Figure 18D:
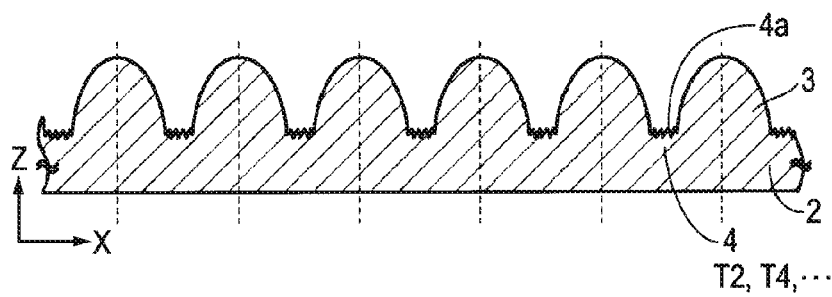
FIG. 18D is a cross-sectional view taken along track T2, T4, . . . shown in FIG. 18B.

FIG. 18A is a schematic plan view showing an example of a structure of an optical element according to a third embodiment of the present invention. FIG. 18B is a partially enlarged plan view of the optical element shown in FIG. 18A. FIG. 18C is a cross-sectional view taken along track T1, T3, . . . shown in FIG. 18B. FIG. 18D is a cross-sectional view taken along track T2, T4, . . . shown in FIG. 18B.

An optical element 1 according to the third embodiment differs from the first embodiment in that, in the three adjacent rows of tracks, primary structures 3 form a tetragonal lattice pattern or a quasi-tetragonal lattice pattern. The term "quasi-tetragonal lattice pattern" means, unlike a regular tetragonal lattice pattern, a tetragonal lattice pattern which is stretched and distorted in the track extending direction (X direction). When the primary structures 3 are arranged periodically in a tetragonal lattice pattern or in a quasi-tetragonal lattice pattern, for example, the primary structures 3 lie adjacent to one another along orientations of 4-fold symmetry. Furthermore, by stretching and distorting the tetragonal lattice, a primary structure can also be laid adjacent to the primary structures on the same track, and an arrangement with high packing density is achieved in which one primary structure lies adjacent to primary structures not only along orientations of 4-fold symmetry but also at two positions on the same track. In such a case, preferably, secondary structures 4 are provided on the adjacent portions, and the primary structures 3 are connected to one another by the secondary structures 4.

In the two adjacent tracks T, at the intermediate positions (at the positions shifted by half a pitch) between the primary structures 3 arranged on one track (e.g., T1), the primary structures 3 on the other track (e.g., T2) are disposed. As a result, as shown in FIG. 18B, in the three adjacent rows of tracks (T1 to T3), primary structures 3 are arranged so as to form a tetragonal lattice pattern or a quasi-tetragonal lattice pattern with the centers of the primary structures 3 being positioned at points a1 to a4.

The height or depth of the primary structures 3 is not particularly limited, and is, for example, about 159 to 312 nm. The pitch P2 in the θ direction with respect to the track T is, for example, about 275 to 297 nm. The aspect ratio (height H/arrangement pitch P) of the primary structures 3 is, for example, about 0.54 to 1.13. Furthermore, the primary structures 3 may not necessarily have the same aspect ratio. The primary structures 3 may be configured so as to have a certain height distribution.

The arrangement pitch P1 of the primary structures 3 in the same track is preferably longer than the arrangement pitch P2 of the primary structures 3 between the two adjacent tracks. Furthermore, preferably, the ratio P1/P2 satisfies the relationship $1.4 < P1/P2 \leq 1.5$, where P1 is the arrangement pitch of the primary structures 3 in the same track, and P2 is the arrangement pitch of the primary structures 3 between the two adjacent tracks. By selecting such a numerical range, the packing density of the structures having an elliptic cone or truncated elliptic cone shape can be improved. Therefore, it is possible to improve anti-reflection characteristics.

In the third embodiment, it is possible to obtain an optical element 1 having excellent transmittance and reflectivity as in the first embodiment.

(4) Fourth Embodiment

Figure 19A:
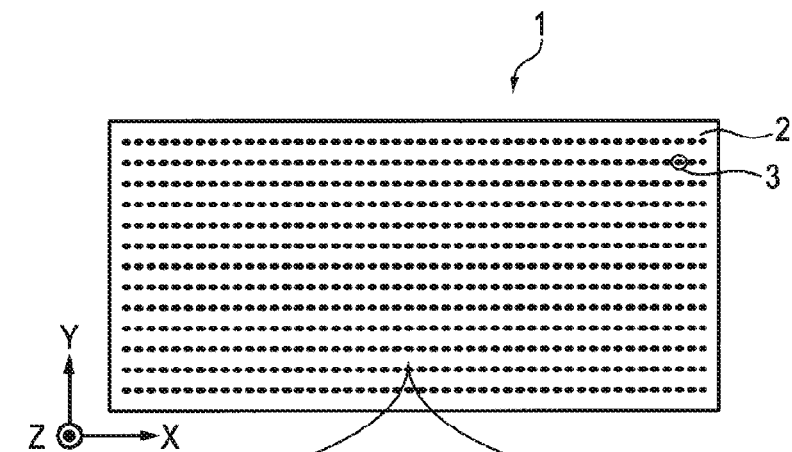
FIG. 19A is a schematic plan view showing an example of a structure of an optical element according to a fourth embodiment of the present invention.
Figure 19B:
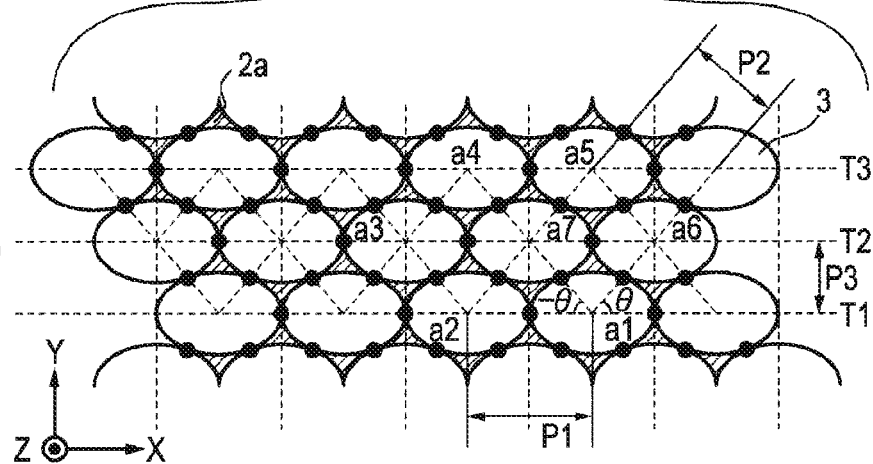
FIG. 19B is a partially enlarged plan view of the optical element shown in FIG. 19A.
Figure 19C:
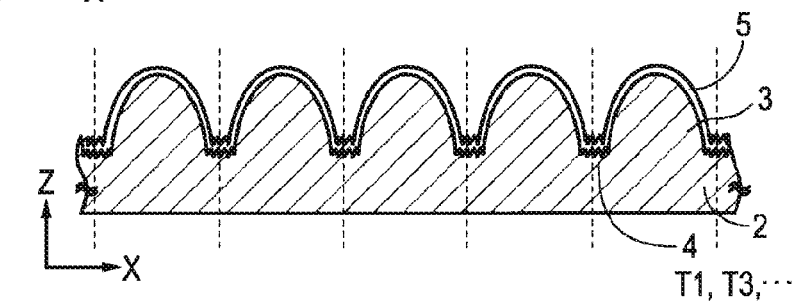
FIG. 19C is a cross-sectional view taken along track T1, T3, . . . shown in FIG. 19B.
Figure 19D:
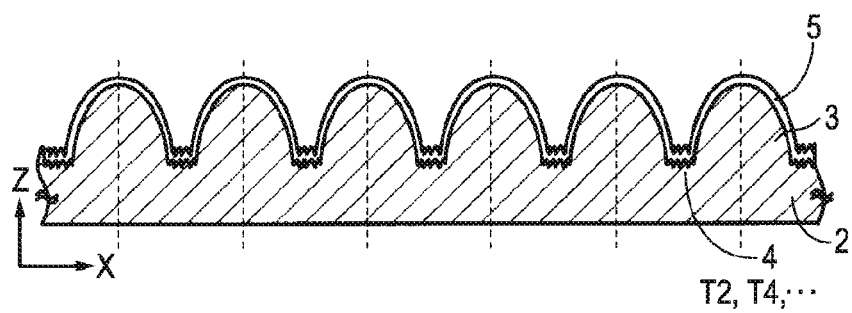
FIG. 19D is a cross-sectional view taken along track T2, T4, . . . shown in FIG. 19B.

FIG. 19A is a schematic plan view showing an example of a structure of an optical element according to a fourth embodiment of the present invention. FIG. 19B is a partially enlarged plan view of the optical element shown in FIG. 19A. FIG. 19C is a cross-sectional view taken along track T1, T3, . . . shown in FIG. 19B. FIG. 19D is a cross-sectional view taken along track T2, T4, . . . shown in FIG. 19B.

An optical element 1 according to the fourth embodiment differs from the first embodiment in that a low-refractive-index layer 5 is disposed over the surface of a base provided with primary structures 3. The low-refractive-index layer 5 is mainly composed of a material having a lower refractive index than the materials constituting the base 2, primary structure 3, and secondary structures 4. As the material for the low-refractive-index layer 4, a conventionally known organic material, such as a fluorine-based resin, or inorganic low-refractive-index material, such as LiF or $MgF_2$, can be used.

In the fourth embodiment, reflectivity can be further reduced compared with the first embodiment.

(5) Fifth Embodiment

Figure 20A:
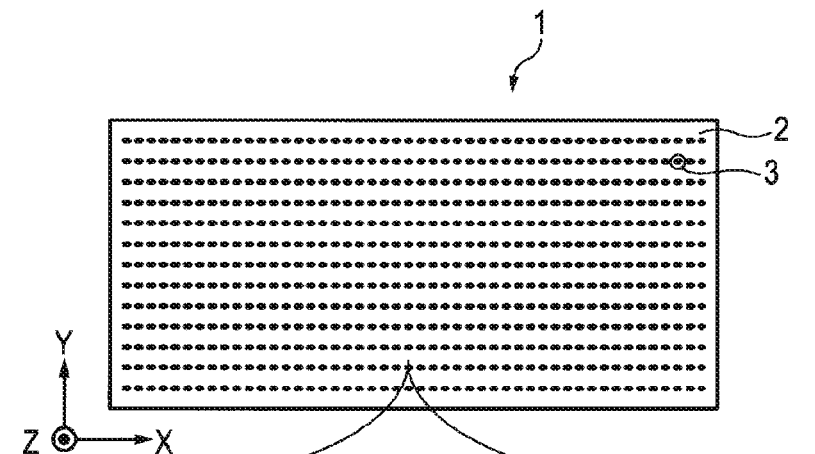
FIG. 20A is a schematic plan view showing an example of a structure of an optical element according to a fifth embodiment of the present invention.
Figure 20B:
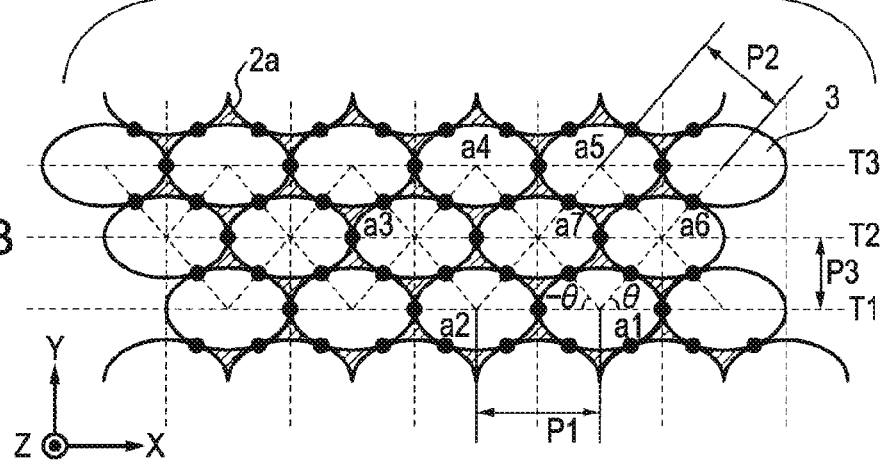
FIG. 20B is a partially enlarged plan view of the optical element shown in FIG. 20A.
Figure 20C:
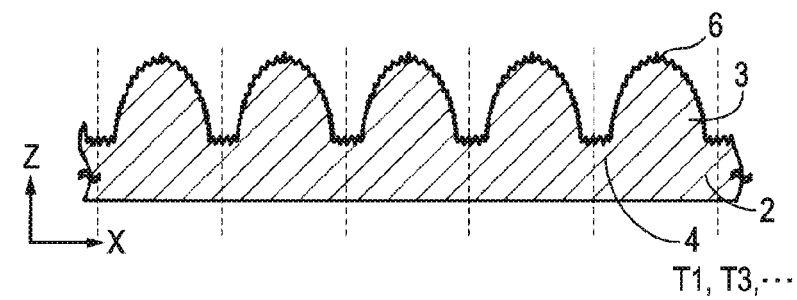
FIG. 20C is a cross-sectional view taken along track T1, T3, . . . shown in FIG. 20B.
Figure 20D:
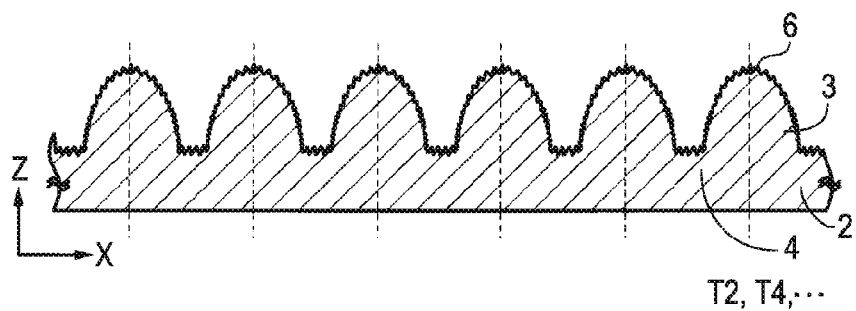
FIG. 20D is a cross-sectional view taken along track T2, T4, . . . shown in FIG. 20B.

FIG. 20A is a schematic plan view showing an example of a structure of an optical element according to a fifth embodiment of the present invention. FIG. 20B is a partially enlarged plan view of the optical element shown in FIG. 20A. FIG. 20C is a cross-sectional view taken along track T1, T3, . . . shown in FIG. 20B. FIG. 20D is a cross-sectional view taken along track T2, T4, . . . shown in FIG. 20B.

An optical element 1 according to the fifth embodiment differs from the first embodiment in that a fine projection-depression shape 6 is formed on the surfaces of primary structures 3 and secondary structures 4. When the optical element 1 has gaps 2a, preferably, the fine projection-depression shape 6 is also formed in the gaps 2a.

In the fifth embodiment, reflectivity can be further reduced compared with the first embodiment.

EXAMPLES

The present invention will be specifically described on the basis of examples. However, it is to be understood that the present invention is not limited only to the examples.

Example 1

First, a glass roll master having an outer diameter of 126 mm was prepared, and a resist layer was formed on the surface of the glass master as follows. That is, a photoresist was diluted to 1/10 with a thinner, and by applying the diluted resist by dipping to the cylindrical surface of the glass roll master at a thickness of about 130 nm, a resist layer was formed. Next, the glass master as a recording medium was transported to the roll master exposure apparatus shown in FIG. 12, and the resist was exposed. Thereby, a latent image spirally extending and forming a quasi-hexagonal lattice pattern in the three adjacent tracks was patterned in the resist.

Specifically, a region in which the quasi-hexagonal lattice pattern was to be formed was irradiated with a laser beam with a power of 0.50 mW/m so as to expose the surface of the glass roll master. Thereby, a quasi-hexagonal lattice pattern having depressions was formed. The resist thickness in the column direction with respect to the track rows was about 120 nm, and the resist thickness in the track extending direction was about 100 nm.

Next, the resist on the glass roll master was subjected to development treatment, in which the resist in the exposed portion was dissolved to perform development. Specifically, the undeveloped glass roll master was placed on a turntable of a developing machine (not shown), and while rotating the glass roll master together with the turntable, a developer was dropwise applied onto the surface of the glass roll master to develop the resist on the surface. Thereby, a resist glass master in which the resist layer have openings in a quasi-hexagonal lattice pattern was obtained.

Next, using roll plasma etching, plasma etching was performed in a $CHF_3$ gas atmosphere. Thereby, etching proceeded only in the quasi-hexagonal lattice pattern portion exposed from the resist layer on the surface of the glass roll master, and the other region was not etched because the photoresist served as a mask. Thus, elliptic cone-shaped depressions were obtained. In this process, the etching amount (depth) in the pattern was varied by changing the etching time. Finally, by completely removing the photoresist by $O_2$ ashing, a moth-eye glass roll master having a hexagonal lattice pattern including depressions was obtained. The depth of the depressions in the column direction was larger than the depth of the depressions in the track extending direction.

Next, the moth-eye glass roll master and an acrylic sheet to which an ultraviolet curable resin had been applied were brought into close contact with each other, and while curing the resin by irradiation with ultraviolet light, the sheet was detached from the roll master. Thereby, an optical element was fabricated.

(Evaluation of Shape)

Figure 21:
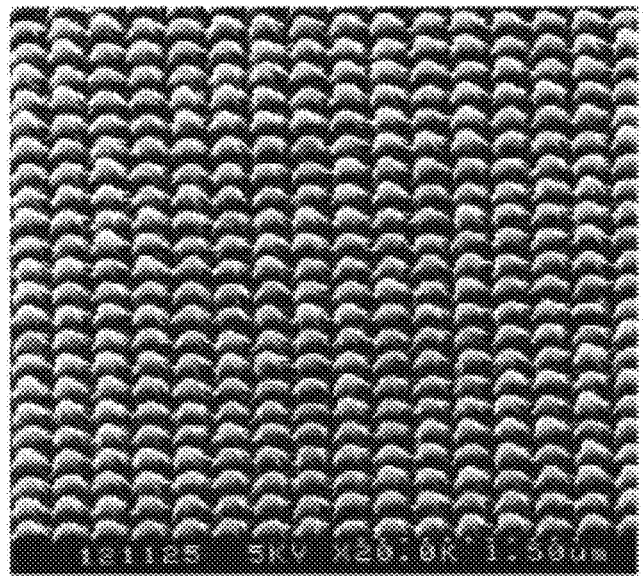
FIG. 21 is a SEM photograph of an optical element of Example 1.

The optical element fabricated as described above was observed with a scanning electron microscope (SEM). The result thereof is shown in FIG. 21. As is evident from FIG. 21, the primary structures in the track direction are connected to one another by secondary structures.

Example 2

A tetragonal lattice pattern was recorded in a resist layer by patterning the resist layer by adjusting the frequency of the polarity inversion formatter signal, the number of revolutions of the roll, the appropriate feed pitch, and the exposure spot for each track. Except for this, in the same manner as that in Example 1, an optical element was fabricated.

Example 3

A quasi-hexagonal lattice pattern was recorded in a resist layer by patterning the resist layer by adjusting the frequency of the polarity inversion formatter signal, the number of revolutions of the roll, the appropriate feed pitch, and the exposure spot for each track. Except for this, in the same manner as that in Example 1, an optical element was fabricated.

Example 4

A quasi-hexagonal lattice pattern was recorded in a resist layer by patterning the resist layer with smaller openings than those in Example 1 by adjusting the frequency of the polarity inversion formatter signal, the number of revolutions of the roll, the appropriate feed pitch, and the exposure spot for each track and by adjusting the conditions for etching and ashing. Except for this, in the same manner as that in Example 1, an optical element was fabricated.

Example 5

A quasi-hexagonal lattice pattern was recorded in a resist layer by patterning the resist layer with smaller openings than those in Example 1 by adjusting the frequency of the polarity inversion formatter signal, the number of revolutions of the roll, the appropriate feed pitch, and the exposure spot for each track and by adjusting the conditions for etching and ashing. Except for this, in the same manner as that in Example 1, an optical element was fabricated.

Example 6

A quasi-hexagonal lattice pattern was recorded in a resist layer by patterning the resist layer by adjusting the frequency of the polarity inversion formatter signal, the number of revolutions of the roll, the appropriate feed pitch, and the exposure spot for each track. Except for this, in the same manner as that in Example 1, a master was fabricated.

(Evaluation of Shape)

The projection-depression surfaces (surfaces provided with structures) of the optical elements of Examples 1 to 5 and the master of Example 6 thus fabricated were observed with an atomic force microscope (AFM) and a scanning electron microscope (SEM). The height and pitch of the structures in each example was determined from the cross-sectional profiles observed with the AFM. The results thereof are shown in Table 1.

TABLE 1

Figure 23:
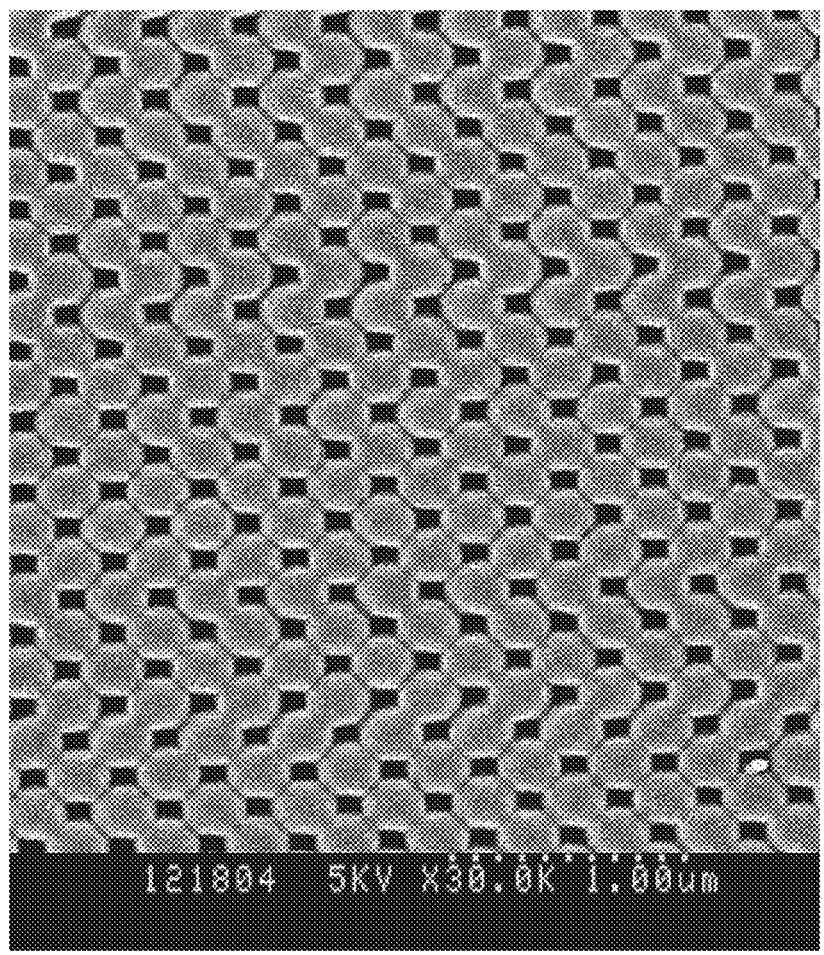
FIG. 23 is a SEM photograph of an optical element of Example 2.
Figure 24A:
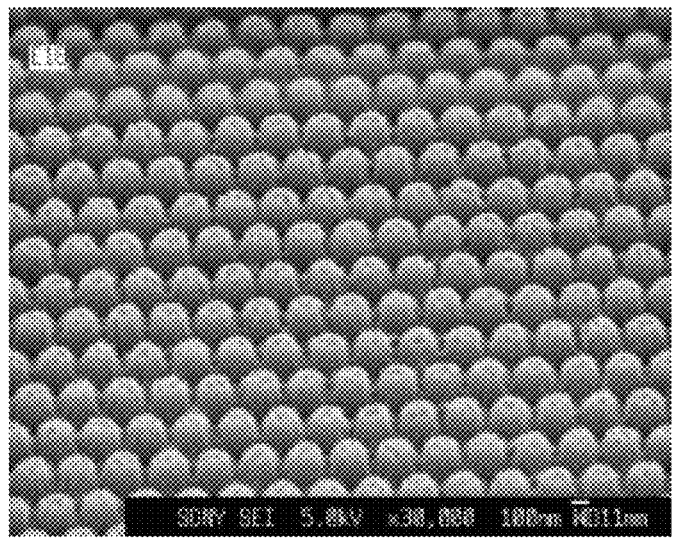
FIGS. 24A and 24B are SEM photographs of an optical element of Example 4.
Figure 24B:
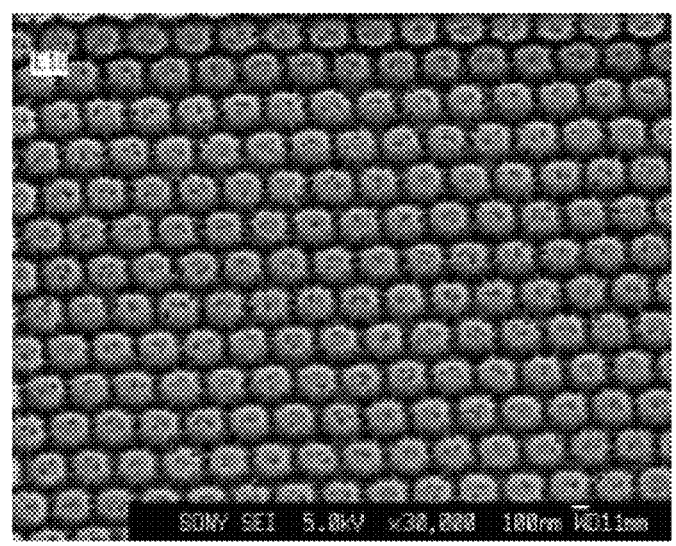
Figure 25:
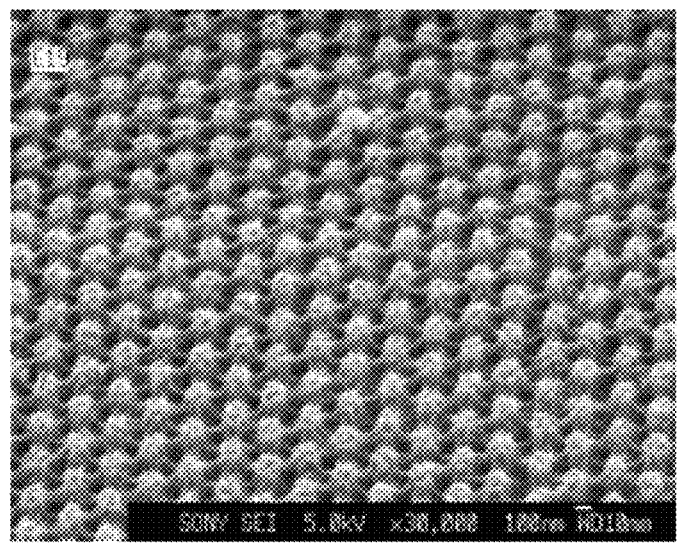
FIG. 25 is a SEM photograph of an optical element of Example 5.
Figure 26A:
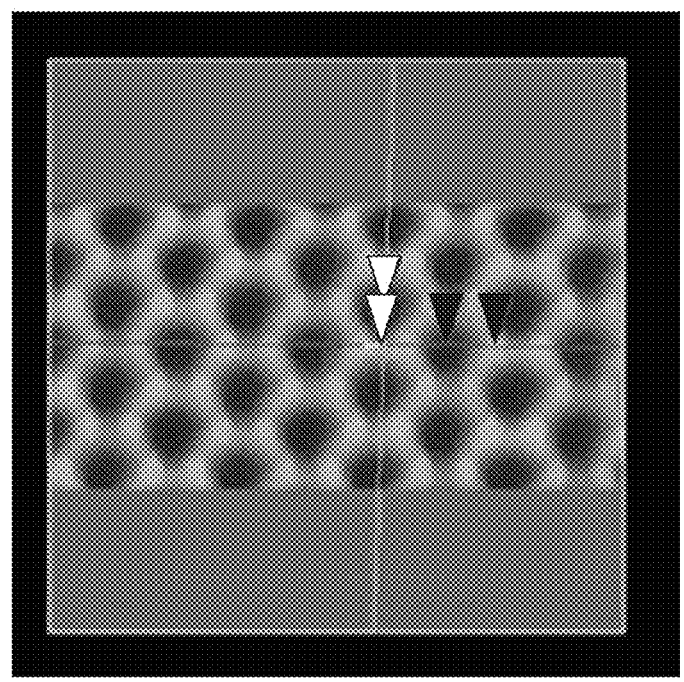
FIG. 26A is an AFM image of an optical element of Example 5.
Figure 26B:
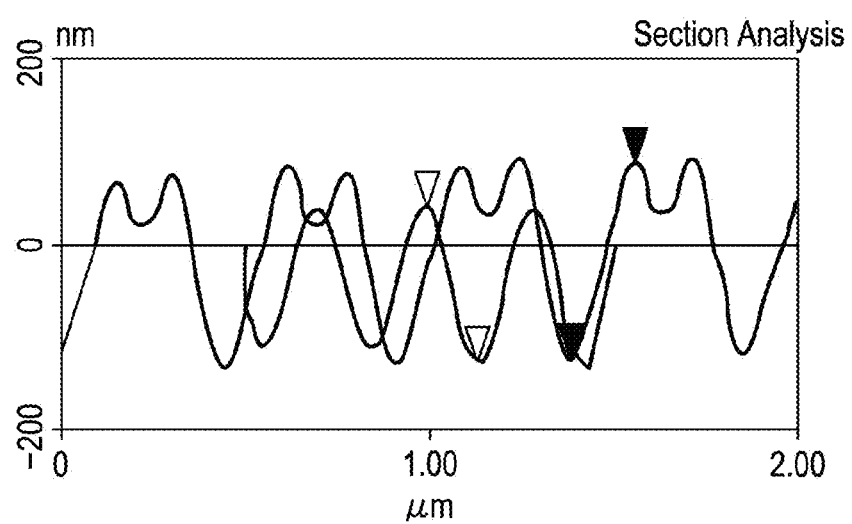
FIG. 26B shows a section profile of the AFM image shown in FIG. 26A.

|  |  | Example 2 | Example 3 | Example 4 | Example 5 | Example 6 |
|---|---|---|---|---|---|---|
| Results of surface observation | | FIG. 23 (SEM image) | — | FIG. 24A FIG. 24B (SEM image) | FIG. 25 (SEM image) | FIG. 26A FIG. 26B (AFM image) |
| Primary structure | Lattice pattern | Tetragonal lattice | Quasi-hexagonal lattice | Quasi-hexagonal lattice | Quasi-hexagonal lattice | Quasi-hexagonal lattice |
|  | Bottom face shape | Ellipse | Ellipse | Ellipse | Ellipse | Ellipse |
|  | Pitch P1 (nm) | 300 | 300 | 295 | 295 | 290 |
|  | Pitch P2 (nm) | 212.1 | 290 | 290 | 290 | 268 |
|  | Pitch P3 (nm) | 150 | 255 | 250 | 250 | 225 |
|  | Height (nm) | 279 | 250 | 220 | 220 | 230 |
| Secondary structure | Formation position | Between primary structures | Between primary structures | On entire surface | On entire surface | Between primary structures |
|  | Frequency component | — | — | About 4 times | About 6 times | — |
|  | Height (nm) | — | 30 | 30 | 20 | 45 |

Figure 22:
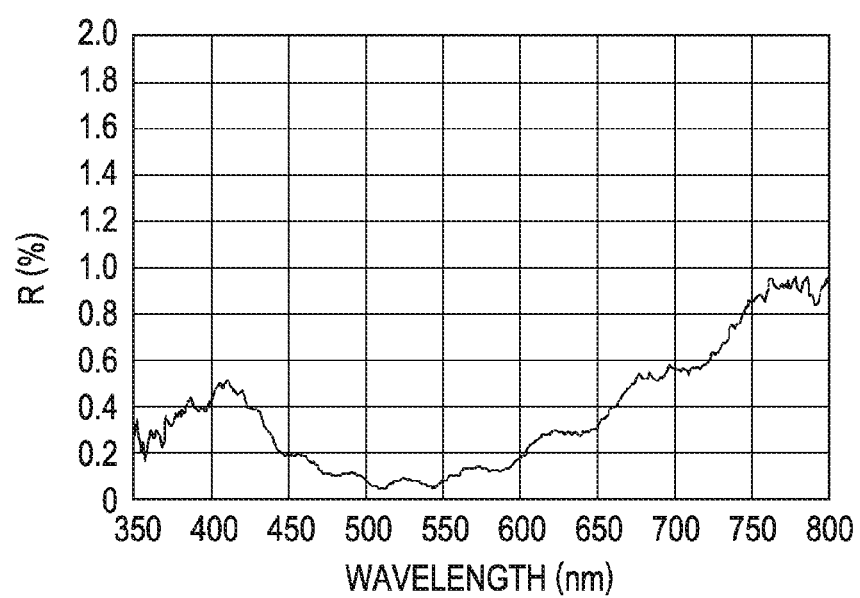
FIG. 22 is a graph showing reflection characteristics of an optical element of Example 3.

FIG. 22 is a graph showing reflection characteristics of the optical element of Example 3. As is evident from FIG. 22, a high anti-reflection effect is obtained, i.e., 1.0% or less in the visible region and, in particular, 0.1% or less in the central wavelength region.

As is evident from FIG. 23, the primary structures lie adjacent to one another along orientations of 4-fold symmetry, and the structures are connected to one another at all the adjacent portions.

As is evident from FIGS. 24A and 24B, protruding portions (secondary structures) are disposed at the bottoms of the bottoms of the primary structures, the protruding portions (secondary structures) being elongated in the direction from the tops to the bottoms of the primary structures. It is also evident that fine holes (secondary structures) are formed in the tops of the primary structures. That is, it is evident that the secondary structures are disposed on the entire surface (surface provided with structures) of the optical element.

As is evident from FIG. 25, protruding portions (secondary structures) elongated in the direction from the tops to the bottoms of the primary structures, etc. are disposed on the entire surface of the optical element. Note that, instead of the protruding portions (projections), depressions may be formed as the secondary structures.

As is evident from FIG. 26, structures (depressions) are formed in a quasi-hexagonal lattice pattern on the surface of the master, and the depth of the structures (depressions) is anisotropic.

Next, the relationship between the height of structures and reflectivity was examined using RCWA (Rigorous Coupled Wave Analysis) simulations.

Test Example 1

Figure 27:
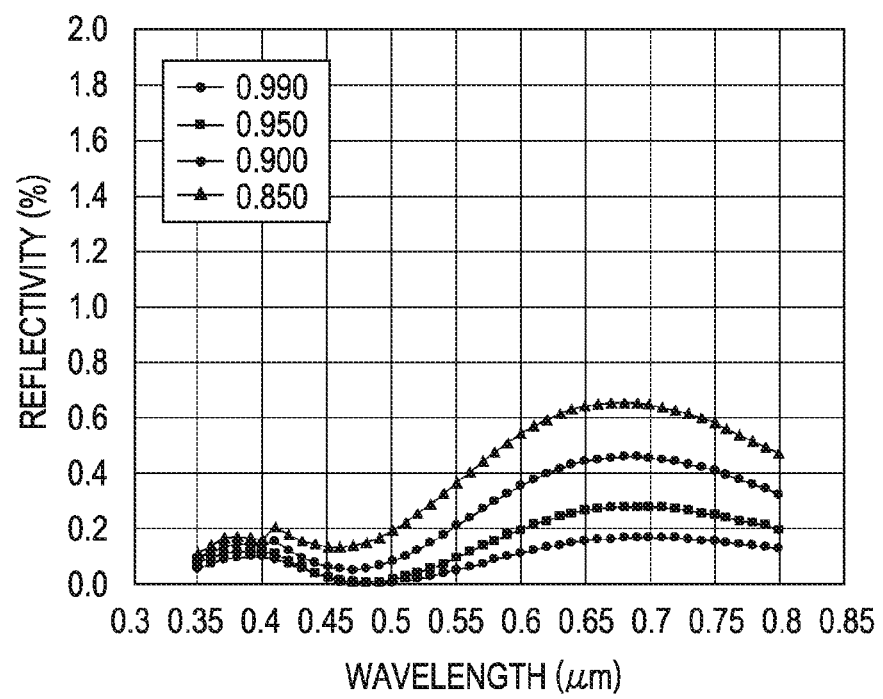
FIG. 27 is a graph showing simulation results of Test Example 1.

RCWA simulations were carried out in which the diameter of the bottom face of the primary structure was varied at 85%, 90%, 95%, and 99% relative to the track pitch P1. The results thereof are shown in FIG. 27.

The simulations were carried out under the following conditions:
Shape of primary structure: bell-shaped
Polarization: unpolarized
Refractive index: 1.48
Track pitch P1: 320 nm
Height of primary structure: 365 nm
Aspect ratio: 1.14
Primary structure arrangement: hexagonal lattice As is evident from FIG. 27, when the diameter of the bottom face of the primary structure is changed and the packing density is decreased, reflectivity degrades.

Test Example 2

RCWA simulations were carried out as in Test Example 1 except that secondary structures, which were low protruding portions with an aspect ratio of 0.3, were disposed between the primary structures in the track direction. The results thereof are shown in FIG. 28.

Figure 28:
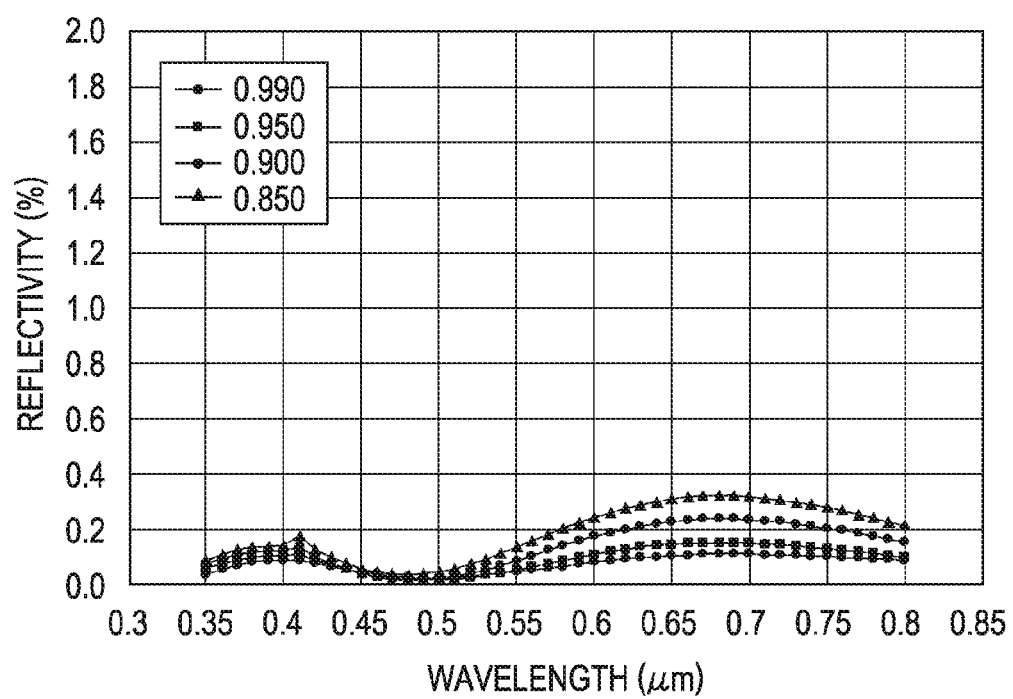
FIG. 28 is a graph showing simulation results of Test Example 2.

As is evident from FIG. 28, when the secondary structures formed of low protruding portions lie between the primary structures in the track direction, even if the packing density is decreased, reflectivity can be suppressed to be low.

Test Example 3

Figure 29:
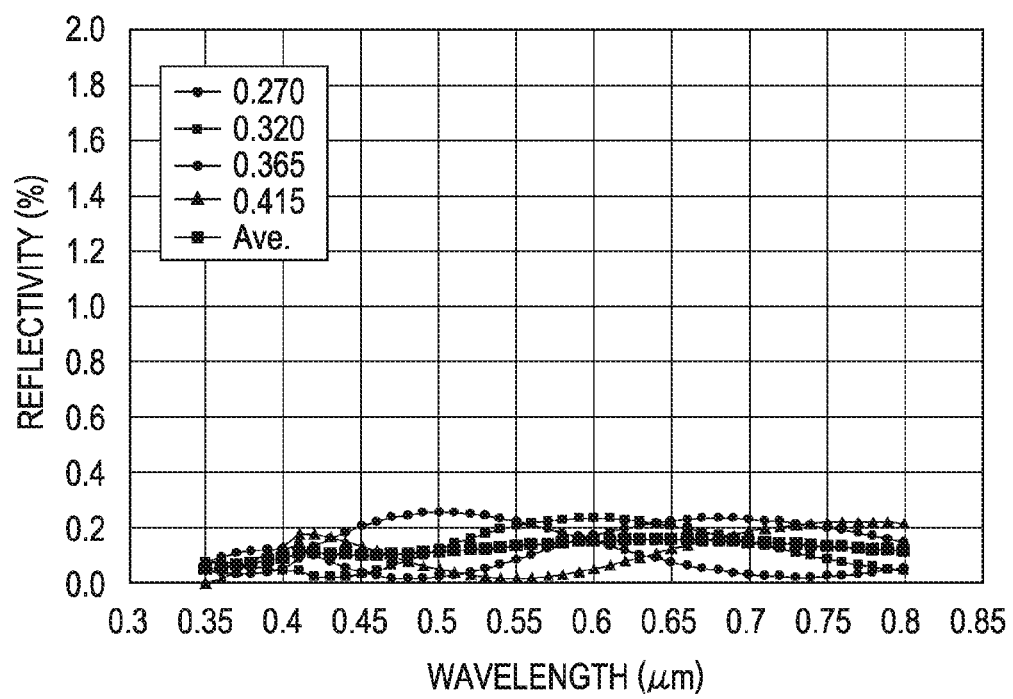
FIG. 29 is a graph showing simulation results of Test Example 3.

Secondary structures having a size corresponding to a quarter of the height of primary structures were disposed between the primary structures in the track direction, and primary structures having the respective heights were arranged in the same proportion. The results at the respective heights and the results (Ave.) in the case where a depth distribution was given are shown in a graph of FIG. 29.
Shape of primary structure: bell-shaped
Polarization: unpolarized
Refractive index: 1.48
Track pitch P1: 320 nm
Diameter of bottom face of primary structure: 90% of track pitch P1
Aspect ratio: 0.93, 1.00, 1.14, and 1.30 (depth: 0.270, 0.320, 0.385, and 0.415 µm, respectively)
Primary Structure Arrangement: Hexagonal Lattice As is evident from FIG. 29, when the secondary structures, which are low protruding portions, are disposed between the primary structures in the track direction, and the primary structures are configured to have a height distribution, low reflection characteristics with small wavelength dependency can be obtained.

Test Example 4

RCWA simulations were carried out with respect to the case where no secondary structures were included and the cases where the order of spatial frequency of secondary structures were set at 2.3 and 4.8. The results thereof are shown in FIG. 30.

Figure 30:
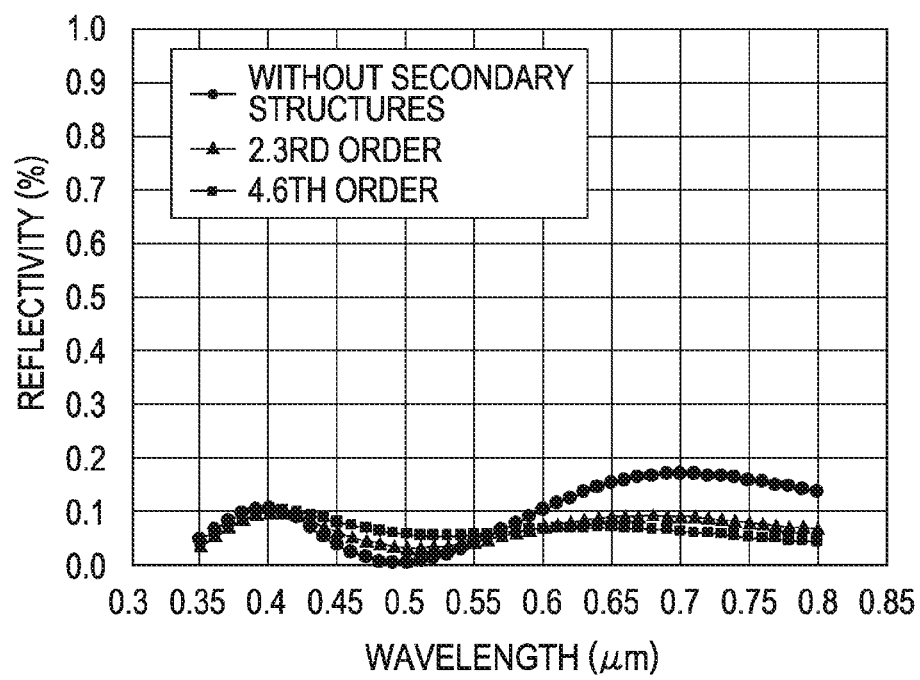
FIG. 30 is a graph showing simulation results of Test Example 4.

The simulations were carried out under the following conditions:

Shape of primary structure: bell-shaped
Polarization: unpolarized
Refractive index: 1.50
Track pitch P1: 320 nm
Height of primary structure: 365 nm
Aspect ratio: 1.14
Primary structure arrangement: hexagonal lattice As is evident from FIG. 30, when the order of the secondary structures is increased, it is possible to obtain optical characteristics with small wavelength dependency and low reflectivity compared with the case where no secondary structures are included.

Test Example 5

Figure 31:
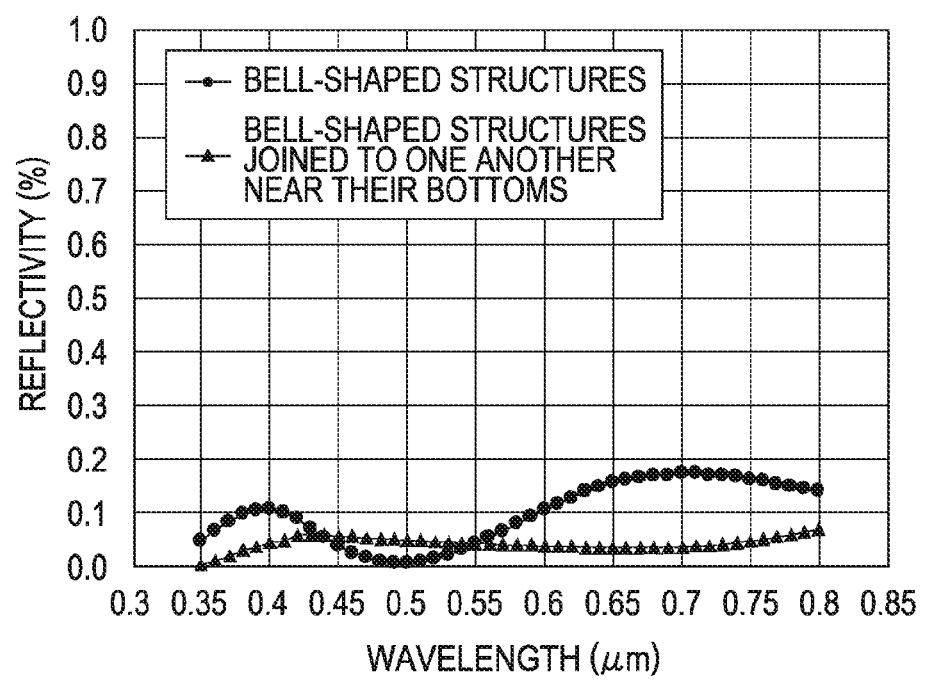
FIG. 31 is a graph showing simulation results of Test Example 5.

RCWA simulations were carried out with respect to the case where bottoms of primary structures were not joined to one another and the case where bottoms of primary structures were overlapped with and joined to one another, the primary structures being arranged in a hexagonal lattice pattern and having a bell-shaped structure in each case. The results thereof are shown in FIG. 31.

The simulations were carried out under the following conditions:
Shape of primary structure: bell-shaped
Polarization: unpolarized
Refractive index: 1.50
Track pitch P1: 320 nm
Height of primary structure: 365 nm
Aspect ratio: 1.14
Primary structure arrangement: hexagonal lattice As is evident from FIG. 31, with respect to the case where bottoms of primary structures are not joined to one another and the case where bottoms of primary structures are overlapped with and joined to one another, the primary structures being arranged in a hexagonal lattice pattern and having a bell-shaped structure in each case, good anti-reflection characteristics can be obtained in the case where the bottoms are joined to one another.

The embodiments and examples of the present invention have been specifically described above. However, it is to be understood that the present invention is not limited to the embodiments and examples described above, and various alterations are possible on the basis of the technical spirit of the present invention.

For example, the numerical values, shapes, materials, etc. described in the embodiments and examples described above are merely examples, and numerical values, shapes, materials, etc. different from those described above may be used as necessary.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

EXPLANATION OF REFERENCE NUMERALS

1 OPTICAL ELEMENT
2 BASE
2a GAP
3 STRUCTURE
4 SECONDARY STRUCTURE
4a PROJECTION-DEPRESSION PORTION
5 LOW-REFRACTIVE-INDEX LAYER
6 FINE PROJECTION-DEPRESSION SHAPE

The invention claimed is:

1. An optical element comprising:
a base; and
primary structures and secondary structures disposed on a surface of the base, each of the primary structures and secondary structures being a single projection or a single depression,
wherein the primary structures have an elliptical cone shape and constitute a plurality of tracks on the surface of the base and are periodically arranged at a fine pitch equal to or smaller than a wavelength of visible light;
the secondary structures are smaller in size than the primary structures;
the secondary structures are provided between the primary structures and along an entire curved surface of the elliptically cone shaped primary structures;
the primary structures are periodically arranged in a hexagonal lattice pattern or in a quasi-hexagonal lattice pattern;
the primary structures lie adjacent to one another along orientations of 6-fold symmetry or substantial 6-fold symmetry; and
a plurality of the secondary structures are provided on the surface of the base in gaps between adjacent primary structures, and the primary structures are connected to one another by the secondary structures,
wherein a pitch of a repeated arrangement of the primary structures is four times or more a pitch of periodic arrangement of the secondary structures.

2. A display device comprising:
an optical element including:
a base; and
primary structures and secondary structures disposed on a surface of the base, each of the primary structures and secondary structures being a single projection or a single depression,
wherein the primary structures have an elliptical cone shape and constitute a plurality of tracks on the surface of the base and are periodically arranged at a fine pitch equal to or smaller than a wavelength of visible light;
the secondary structures are smaller in size than the primary structures;
the secondary structures are provided between the primary structures and along an entire curved surface of the elliptically cone shaped primary structures;
the primary structures are periodically arranged in a hexagonal lattice pattern or in a quasi-hexagonal lattice pattern;
the primary structures lie adjacent to one another along orientations of 6-fold symmetry or substantial 6-fold symmetry; and
a plurality of the secondary structures are provided on the surface of the base in gaps between adjacent primary structures, and the primary structures are connected to one another by the secondary structures,
wherein a pitch of a repeated arrangement of the primary structures is four times or more a pitch of periodic arrangement of the secondary structures.

3. A solar cell comprising:
an optical element including:
a base; and
primary structures and secondary structures disposed on a surface of the base, each of the primary structures and secondary structures being a single projection or a single depression, wherein the primary structures have an elliptical cone shape and constitute a plurality of tracks on the surface of the base and are periodically arranged at a fine pitch equal to or smaller than a wavelength of visible light;

the secondary structures are smaller in size than the primary structures;

the secondary structures are provided between the primary structures and along an entire curved surface of the elliptically cone shaped primary structures;

the primary structures are periodically arranged in a hexagonal lattice pattern or in a quasi-hexagonal lattice pattern;

the primary structures lie adjacent to one another along orientations of 6-fold symmetry or substantial 6-fold symmetry; and a plurality of the secondary structures are provided on the surface of the base in gaps between adjacent primary structures, and the primary structures are connected to one another by the secondary structures, wherein a pitch of a repeated arrangement of the primary structures is four times or more a pitch of periodic arrangement of the secondary structures.

4. An illuminating device comprising:

an optical element including:

a base; and primary structures and secondary structures disposed on a surface of the base, each of the primary structures and secondary structures being a single projection or a single depression, wherein the primary structures have an elliptical cone shape and constitute a plurality of tracks on the surface of the base and are periodically arranged at a fine pitch equal to or smaller than a wavelength of visible light;

the secondary structures are smaller in size than the primary structures;

the secondary structures are provided between the primary structures and along an entire curved surface of the elliptically cone shaped primary structures;

the primary structures are periodically arranged in a hexagonal lattice pattern or in a quasi-hexagonal lattice pattern;

the primary structures lie adjacent to one another along orientations of 6-fold symmetry or substantial 6-fold symmetry; and a plurality of the secondary structures are provided on the surface of the base in gaps between adjacent primary structures, and the primary structures are connected to one another by the secondary structures, wherein a pitch of a repeated arrangement of the primary structures is four times or more a pitch of periodic arrangement of the secondary structures.

5. The optical element according to claim 1, wherein the primary structures are projections and the secondary structures are protrusions.

6. The optical element according to claim 1, wherein the primary structures are depressions and the secondary structures are projections.

7. The optical element according to claim 1, wherein the primary structures are projections and the secondary structures are depressions.

8. The optical element according to claim 1, wherein the primary structures are depressions and the secondary structures are depressions.

9. The optical element according to claim 1, wherein the secondary structures include corrugated fine projection-depression portions including depressions and projections.

10. The optical element according to claim 1, wherein a plurality of the secondary structures are arranged in each of two different directions between the primary structures.

* * * * *